(12) United States Patent
Favor et al.

(10) Patent No.: US 11,989,285 B2
(45) Date of Patent: May 21, 2024

(54) THWARTING STORE-TO-LOAD FORWARDING SIDE CHANNEL ATTACKS BY PRE-FORWARDING MATCHING OF PHYSICAL ADDRESS PROXIES AND/OR PERMISSION CHECKING

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

(21) Appl. No.: 17/472,376

(22) Filed: Sep. 10, 2021

(65) Prior Publication Data

US 2022/0358209 A1 Nov. 10, 2022

Related U.S. Application Data

(63) Continuation-in-part of application No. 17/351,927, filed on Jun. 18, 2021, now Pat. No. 11,416,406, which is a continuation-in-part of application No. 17/315,262, filed on May 7, 2021, now Pat. No. 11,416,400, application No. 17/472,376, filed on Sep. 10, 2021 is a continuation-in-part of application No. 17/315,262, filed on May 7, 2021, now Pat. No. 11,416,400.

(51) Int. Cl.
*G06F 21/54* (2013.01)
*G06F 21/51* (2013.01)
*G06F 21/55* (2013.01)

(52) U.S. Cl.
CPC .............. *G06F 21/54* (2013.01); *G06F 21/51* (2013.01); *G06F 21/554* (2013.01); *G06F 2221/033* (2013.01)

(58) Field of Classification Search
CPC ........ G06F 21/54; G06F 21/51; G06F 21/554; G06F 2221/033
See application file for complete search history.

(56) References Cited

U.S. PATENT DOCUMENTS

| | | |
|---|---|---|
| 5,526,510 A | 6/1996 | Akkary et al. |
| 5,742,831 A | 4/1998 | Creta |
| 5,745,729 A | 4/1998 | Greenley et al. |
| 6,006,312 A | 12/1999 | Kohn et al. |
| 6,662,280 B1 | 12/2003 | Hughes |

(Continued)

*Primary Examiner* — Jae U Yu
(74) *Attorney, Agent, or Firm* — Eric W. Cernyar; E. Alan Davis; Huffman Law Group, PC

(57) ABSTRACT

A method and system for mitigating against side channel attacks (SCA) that exploit speculative store-to-load forwarding is described. The method comprises ensuring that the physical load and store addresses match and/or that permissions are present before speculatively store-to-load forwarding. Various improvements maintain a short load-store pipeline, including usage of a virtual level-one data cache (DL1), usage of an inclusive physical level-two data cache (DL2), storage and lookup of physical data address equivalents in the DL1, and using a memory dependence predictor (MDP) to speed up or replace store queue camming of load data addresses against store data addresses.

27 Claims, 8 Drawing Sheets

(56) References Cited

U.S. PATENT DOCUMENTS

| | | | |
|---|---|---|---|
| 7,058,065 B2* | 6/2006 | Musoll | G06F 9/546 |
| | | | 370/428 |
| 8,521,982 B2 | 8/2013 | Cargnoni et al. | |
| 8,984,254 B2 | 3/2015 | Tran et al. | |
| 10,397,362 B1 | 8/2019 | Volpe et al. | |
| 10,565,113 B2 | 2/2020 | Avudaiyappan | |
| 11,625,335 B2 | 4/2023 | Borikar et al. | |
| 2002/0120813 A1* | 8/2002 | Boatright | G06F 9/30181 |
| | | | 712/E9.046 |
| 2003/0023814 A1 | 1/2003 | Barroso et al. | |
| 2004/0148468 A1 | 7/2004 | Hooker | |
| 2006/0107021 A1 | 5/2006 | Barrick et al. | |
| 2009/0172360 A1 | 7/2009 | Hikichi | |
| 2013/0185792 A1 | 7/2013 | Balakrishnan et al. | |
| 2013/0304991 A1 | 11/2013 | Böttcher et al. | |
| 2014/0215191 A1 | 7/2014 | Kanapathipillai et al. | |
| 2015/0019840 A1 | 1/2015 | Anderson et al. | |
| 2015/0331796 A1 | 11/2015 | Guthrie et al. | |
| 2017/0293567 A1 | 10/2017 | Bryant et al. | |
| 2019/0108028 A1 | 4/2019 | Gonzalez et al. | |
| 2019/0108035 A1 | 4/2019 | Gonzalez et al. | |
| 2020/0133861 A1 | 4/2020 | Avudaiyappan | |
| 2022/0357955 A1 | 11/2022 | Favor et al. | |
| 2022/0358037 A1 | 11/2022 | Favor et al. | |
| 2022/0358038 A1 | 11/2022 | Favor et al. | |
| 2022/0358039 A1 | 11/2022 | Favor et al. | |
| 2022/0358040 A1 | 11/2022 | Favor et al. | |
| 2022/0358044 A1 | 11/2022 | Favor et al. | |
| 2022/0358045 A1 | 11/2022 | Favor et al. | |
| 2022/0358046 A1 | 11/2022 | Favor et al. | |
| 2022/0358047 A1 | 11/2022 | Favor et al. | |
| 2022/0358048 A1 | 11/2022 | Favor et al. | |
| 2022/0358052 A1 | 11/2022 | Favor et al. | |
| 2022/0358210 A1 | 11/2022 | Favor et al. | |

* cited by examiner

THWARTING STORE-TO-LOAD FORWARDING SIDE CHANNEL ATTACKS BY PRE-FORWARDING MATCHING OF PHYSICAL ADDRESS PROXIES AND/OR PERMISSION CHECKING

RELATED APPLICATIONS

This application is a continuation-in-part of U.S. patent application Ser. No. 17/351,927, filed Jun. 18, 2021, entitled "Store to Load Forwarding Using Physical Address Proxies" and U.S. patent application Ser. No. 17/315,262, filed May 7, 2021, entitled "Hardware Cache Coherency Using Physical Address Proxies," both of which are herein incorporated by reference.

TECHNICAL FIELD

This application relates to microprocessors, and in particular, to modifications made to thwart microarchitecture-level side-channel attacks.

BACKGROUND

Speculative execution has long been used to enhance performance and reduce bottlenecks in instruction execution. One example of speculative execution is forwarding data from a store to a load before the store instruction and result have been fully validated (i.e., without any possibility of abort of the store instruction).

Many of these bottlenecks emerge from the aspects of conventional processor architectures. Most conventional processors utilize caches that are physically indexed and/or physically tagged. Such processors require a lookup in a translation lookaside buffer (TLB), and if there is a TLB miss, a full time-consuming tablewalk, to translate a virtual store or load address to its physical address, which can be a time-consuming process. To prevent tablewalk bottlenecks, high performance processors speculatively forward a store result to a load instruction based upon a match of the load and store virtual addresses, and then wait to commit the load instruction until the tablewalk supplies the physical address along with permission bits. After the confirmatory comparison of the load and store physical addresses and permissions check are completed, the load instruction is committed.

Speculative forwarding can create a mis-speculation "shadow" (and in the case of a TLB walk, a fairly long one) in which dependent instructions following a load instruction that received a mis-speculated store result can pollute the cache with data that is dependent upon the mis-speculated store result, exposing the store result to recovery in a side channel cache-probing timing attack (more generally, a side channel attack or SCA).

A side channel is an unintended pathway that leaks information from one software program (a victim program) to another (the attacker program). The leaked information may be a secret that the victim does not want the attacker to know, such as an encryption key or bank account information. The unintended pathway can, in theory, be any shared hardware resource, such as a central processing unit (CPU) cache, a branch predictor, or a translation lookaside buffer (TLB).

SCAs exploit microarchitectural speculation in high-performance CPUs to break architectural security protections. Speculative execution of an instruction means execution of the instruction during a time when at least one instruction older in program order than the instruction has not completed execution such that a possibility exists that execution of the older instruction will result in an abort, i.e., flush, of the speculatively executed instruction. Opportunities for speculative execution by a CPU are often created by predictions, such as predictions of branch instruction outcomes or predictions that the data written to memory by an instruction is the data that a later instruction wants to read. As a result, an attacker may "encode" privileged information into persistent microarchitectural state. For example, an attacker may encode privileged information, such as a security key, in the presence or absence of a line in a cache if speculatively accessed. This presence or absence of the speculatively accessed line in the cache is not the architectural state of the CPU and therefore not directly visible by the attacker program. However, it may be indirectly visible to an SCA.

In some cases, speculative execution may leave traces of the privileged information in microarchitectural state that can then be revealed based upon the time it takes selected instructions to execute. An SCA exploits detect these timing "signals" or differences in the timing of accesses to memory addresses to infer the privileged information used by the victim program.

One prominent example of an SCA that uses timing operations to discover privileged information left in microarchitectural state is the "Flush and Reload" exploit. Briefly summarized, an attacker script first flushes cache lines from the cache at 256 possible memory addresses the victim program will access depending upon the value of a secret data byte the attacker wants to determine (e.g., a byte of an encryption key). The attacker program then causes or waits for the victim program to access the secret data byte, use the secret data byte value to generate a memory address (that is one of the 256 known addresses), and bring the data at the (secret data byte-dependent) generated address into one of the 256 cache lines. Next, the attacker program systematically accesses the 256 possible address locations, timing how long each of the 256 accesses takes, which is affected by whether a cache hit or cache miss occurs. By determining which of the 256 addresses was most quickly accessed (i.e., got a cache hit), the attacker program indirectly determines the value of the secret data byte.

There are more details that shed further insight on the exploit. By reading technical manuals and/or using various tricks of the trade, an attacker learns that a victim store instruction carries a secret value (e.g., a byte), and the attacker learns the address in a protected memory space where this secret value is stored. The attacker writes a script to flush the cache. The attacker also knows that the microarchitecture will likely speculatively forward the store data to the load if a certain number of lower order bits (e.g., the lowest 12 bits) of the load address (physical or virtual, depending on the implementation) are the same. Accordingly, the attacker generates a load instruction with a load data address that partially matches the store data address. The higher bits of the load data address may also be specified so that the TLB is unlikely to have the load virtual address in any of its entries, forcing a time-consuming tablewalk to shadow the attacker's subsequent operations. Speculative execution of the malicious load instruction forwards the secret data to the malicious load.

Following the malicious load, the attacker script transforms the secret value—just a single byte in this example— using a combinatorial function that transforms the secret value into an arbitrary address. The combinatorial function is designed to map each possible value of the secret byte to a unique and identifiable one of the 256 lines of cache. A second load then loads whatever arbitrary value exists at the arbitrary address into the corresponding one of 256 lines of cache.

The attacker's second load pollutes the DL1 cache with the arbitrary value before the microarchitecture discovers the physical address mismatch and resulting mis-speculation, at which point the attacker's load instructions are aborted. After the DL1 cache is polluted, an independent set of attacker instructions—executed before or after the abort and unaffected by the abort of the first and second load instructions—iteratively probes each of the 256 lines of the DL1 cache, using the same combinatorial function used to pollute the cache, to determine which byte value registers a "hit" in the cache. The cache line into which the result of the combinatorial function on the secret byte got put will register a "hit" much faster than the other 255 cache lines, each of which must be filled from memory. With the use of a microarchitectural debugging tool—namely, a microinstruction that times how long it takes an instruction to execute—the attacker ascertains the secret byte. This entire process, from cache flush to timing probe, is performed serially and/or in parallel for each byte of secret data.

To summarize, in the time that it takes to discover the physical address mismatch—which is particularly long if the load address is constructed and the load instruction presented in a way that makes the TLB unlikely to have the load virtual address in any of its entries—a malicious dependent load or store instruction can pollute the cache, setting the SCA up to recover the store result using a subsequent cache-probing timing attack Additional details of how this and other SCA variants work are described in U.S. patent application Ser. No. 16/937,392, filed Jul. 23, 2020, and entitled "PROCESSOR THAT PREVENTS SPECULATIVE EXECUTION ACROSS TRANSLATION CONTEXT CHANGE BOUNDARIES TO MITIGATE SIDE CHANNEL ATTACKS," whose background section is hereby incorporated into this background section and whose remaining sections are incorporated by reference, for the benefit of the remaining sections, for all other (non-background) purposes.

A fair generalization of SCAs is that they prey on processors that engage in speculative execution of instructions. Put another way, speculative execution opens up vulnerabilities to SCAs. But eliminating speculative execution is not a practical option. Speculative execution significantly improves processor performance. Therefore, high performance processors will, out of competitive necessity, continue to engage in speculative execution.

Accordingly, there is a need for a high-performance microprocessor that thwarts side channel attacks (SCAs) without giving up performance gains obtained by speculative execution. In order to avoid significant reductions in performance, it is also desirable to thwart side channel attacks without lengthening the execution pipeline.

SUMMARY

Embodiments are described herein of a high-performance, speculative out-of-order executing super-scalar processor with a short execution pipeline that mitigates SCAs by preventing or limiting the speculation in various circumstances. These circumstances may be relatively infrequent and indicative of or associated with an attempt to exploit speculative execution. For example, a load may lack the proper permissions and/or the load's complete physical data address may not match a store's complete physical data address.

Some of these embodiments incorporate microarchitectural modifications to enable an effectively complete physical comparison of the physical load and store addresses before forwarding a store result to a load value without any significant impact to performance. This is practically impossible in conventional processors without lengthening the pipeline of the load-store unit (LSU).

Other systems, devices, methods, features, and advantages will become apparent to one with skill in the art upon examination of this disclosure. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all the drawings depict all the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, there is no restrictive one-to-one correspondence between any given embodiment of the invention and any of the drawings.

DETAILED DESCRIPTION

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (e.g., spatial dimensions) may be used explicitly or implicitly herein as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

In describing preferred and alternate embodiments of the technology described herein, specific terminology is employed for the sake of clarity. Technology described herein, however, is not intended to be limited to the specific terminology so selected, and it is to be understood that each specific element includes all technical equivalents that operate similarly to accomplish similar functions.

The description of the embodiments of this invention is set forth in FIGS. 1-9. Before proceeding with that description, a more detailed description of how an SCA exploits conventional STLF is presented in connection with FIG. 10. This description is immediately followed by a somewhat lengthy prefatory discussion of concepts relevant to the various embodiments. Only after that prefatory discussion are the details of FIGS. 1-9 discussed at length.

Figure 10:
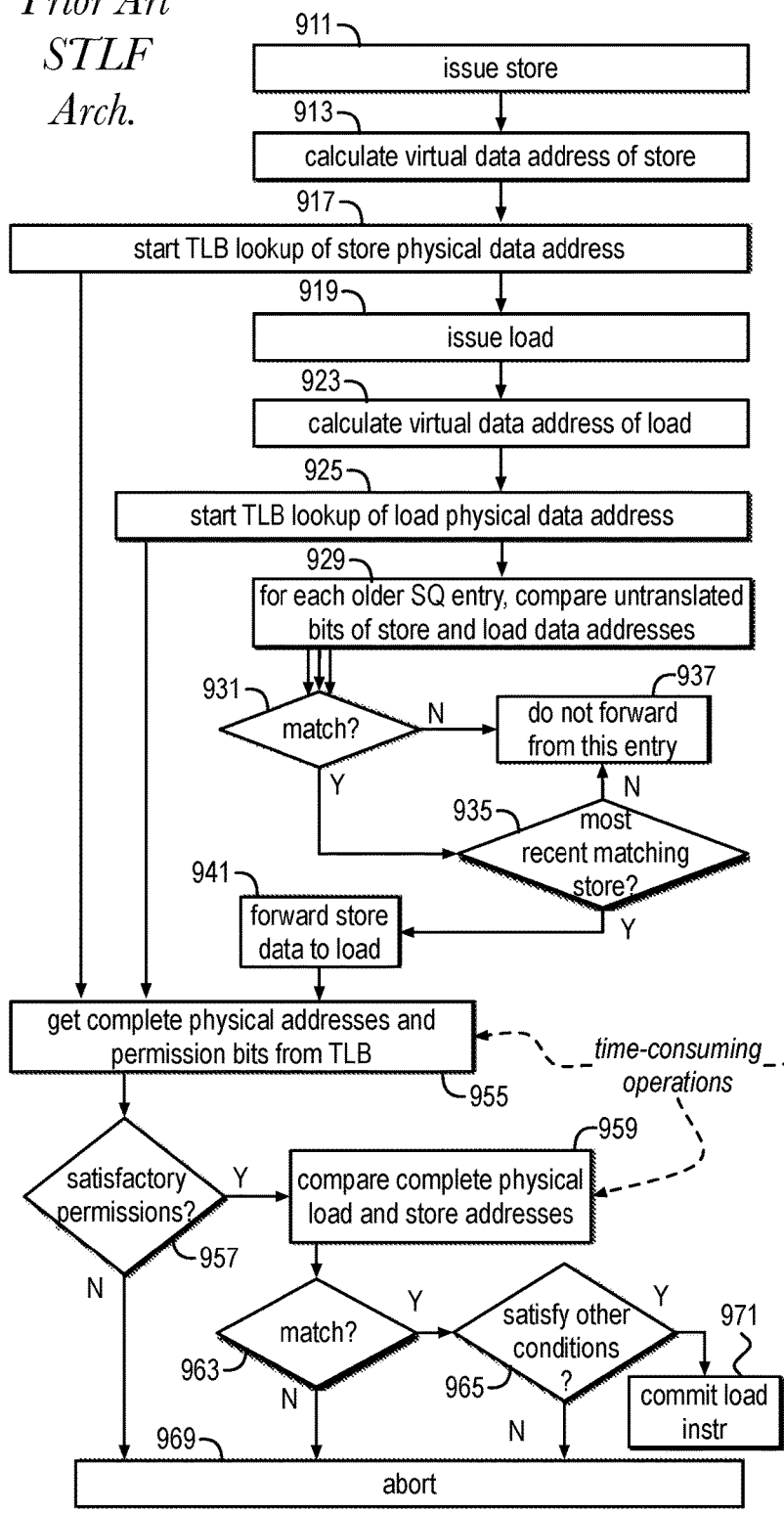
FIG. 10 illustrates the art of a Spectre SCA attack by juxtaposing a conventional STLF operation with an SCA attack on it.
Figure 10:
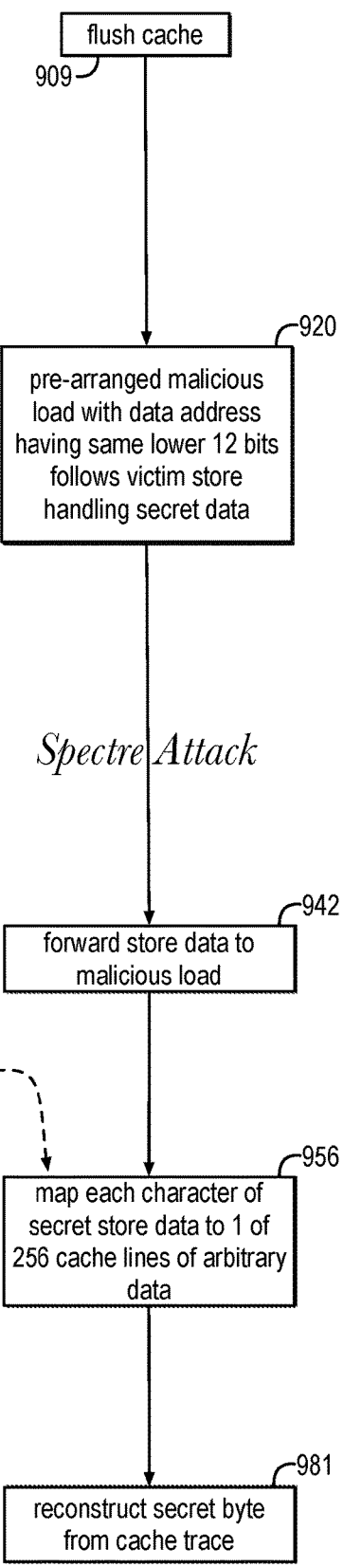

How Spectre Exploits Prior Art STLF (FIG. 10)

FIG. 10 is a parallel process flow chart that illustrates a prior art store-to-load forwarding (STLF) implementation 900 and how a Spectre attack could exploit it. Analysis begins with block 911 when an issue is stored. In block 913, the processor calculates the virtual data address of the store. Load and store instructions typically include as operands a base address and an offset which are added together to yield the virtual load or store data address. Once this virtual data address is determined, it is forwarded to the translation lookup buffer (TLB) to lookup the physical data address and permission bits (e.g., write or read access and whether the data is or is part of an executable) for the data (block 17). If this information is not stored in the TLB, the TLB performs a tablewalk to determine the physical address. This can take a significant amount of time, which could constitute a large part of the desired execution time for the store instruction. This is hinted at by the long arrow from block 917 (start TLB lookup) to block 955, when the TLB lookup is complete.

Turning to block 919—which, like block 955, proceeds from block 917—a load instruction is issued that is potentially able to forward data from the store. In block 923, the processor calculates the virtual data address based upon the values and/or addresses of its operands. Once this virtual data address is determined, it is forwarded to the translation lookup buffer (TLB) to lookup the physical data address (block 925). If this information is not stored in the TLB, the TLB performs a tablewalk to determine the physical address. Again, this can take a significant amount of time, which could constitute a large part of the desired execution time for the load instruction. This is also hinted at by a long arrow proceeding from block 925 to block 955. (However, no significance should be attached to the relative size of the 917-to-955 arrow and the 925-to-955 arrow.)

In this FIG. 10, the TLB lookup is not completed in time to condition STLF on appropriate permissions and on matching physical addresses (PAs). For this reason, it is conventional in the high-performance microprocessor field for speculative store-to-load forwarding to commence before the permissions and physical load addresses are discovered. So, while the TLB lookup or tablewalk is underway, in block 929—which, like block 955, proceeds from block 925—the untranslated bits of the load's virtual data address are compared to the store virtual data addresses of the SQ to find one or more that match, if any. In a typical 64-bit architecture, the bottom 12 bits of a virtual address are untranslated, that is, the same as the bottom 12 bits of the physical address of which the virtual address is derived. This comparison requires the equivalent of a 12-bit comparator for each entry of the SQ an expensive process in terms of the time and energy involved. This method of identifying a matching entry is referred to as "content address matching" (CAM). Because it is expedient to do so, the process of content address matching is referred to herein as "to cam" (infinitive), "camming" (present participle and gerund), and "cammed" (past tense).

As shown in blocks 931 and 937, for any SQ entry whose bottom twelve address bits do not match, no forwarding is done from that entry to the load. If, on the other hand, an SQ entry's bottom twelve address bits matches the load's bottom twelve address bits (block 931), then a determination is made whether the entry is for the most recent matching store (block 935). If not, then no forwarding is done from that entry to the load. If there is a match (block 931) and it is the most recent matching store (block 935), then the store data is forwarded to the load (block 941).

After the store data has been speculatively forwarded to the load, the permissions of the load instruction are checked (block 957). The store's permissions are likely to have already been checked earlier because the store was executed earlier. But if not, the store's permissions are also checked here. A store and/or load that does not have satisfactory permissions is aborted (block 969). If both the load and store have satisfactory permissions, then the complete physical load data and store data addresses are compared (block 959). If there is a match (block 963) and any other applicable conditions are met (block 965), then the load instruction is committed. Otherwise, the load instruction is aborted (block 900).

On the right side of FIG. 10 is a flow chart that is loosely synchronized with the left half of FIG. 10. This flow chart illustrates operations of the Spectre SCA. These operations have already been discussed in the background of this application. In block 902, the Spectre SCA flushes the cache so that it can collect traces of secret data that survive after any illegal instructions have been aborted. This is "preferably" done (from the attacker's point of view) before a victim store instruction handling secret data is issued (block 911). In block 920, which represents an instantiation of block 919, a pre-arranged malicious load issues shortly after the issuance of a victim store instruction that handles secret data. The load instruction has a data address with the same lower 12 bits as the data address of the victim store instruction. This requires some foreknowledge or educated guessing of the address or PC of a sensitive store instruction. In block 942, which is an instantiation of block 941, the data of the victim store is speculatively forwarded to the malicious load.

In block 956, each character of the secret store data is mapped to 1 to 256 cache lines of arbitrary data by, for example, applying a combinatorial formula to map the secret data (more particularly, a character of the secret data) to one of 256 possible cache lines. In many cases, the Spectre SCA has time to perform these calculations before the load instruction and newer instructions are aborted, because the actions of performing a TLB lookup with tablewalk and comparing complete physical load and store addresses takes several hundred clock cycles to complete.

Block 956's mapping of secret data to 1 of 256 cache lines of arbitrary data leaves a trace of the secret character in the cache that, in traditional cache designs, survives after the malicious load instruction of block 919*a* is aborted. In block 981, the data is then reconstructed from the cache trace by finding the one of 256 lines that can be loaded the fastest.

Currently, manufacturers of high-performance microprocessors face a conundrum. They can either maintain their current speculative forwarding designs or delay store-to-load forwarding until the physical addresses can be compared and the permissions checked, thereby lengthening the execution time and sacrificing performance. Applicant has developed techniques that reduce the amount of time and resources required to acquire and/or effectively compare complete physical load and store data addresses.

The Challenge of Using Conventional Approaches to Close SCA Opportunities

The various embodiments described herein thwart or prevent certain types of STLF SCAs by, at a minimum, determining that the complete load and store physical addresses match before forwarding store data to a load instruction. In one embodiment using classical approaches to performing physical address matching and satisfactory permission determinations (but prior to instead of after speculative execution), the following tasks are completed: (1) calculate the virtual load data address; (2) translate the virtual load data address into a complete physical load data address using a translation lookaside buffer (TLB); (3) cam a portion of the load data address against a store queue to speculatively determine zero or more candidate stores to forward from; (4) perform physical load and store data address comparisons for each candidate store to ensure that the complete store and load data addresses match; (5) if more than one candidate store's physical data address matches the load's physical data address, then determine which store is the most recent older store; and (6) check the permission bits. (An explanation of the term "cam" is set forth in the discussion of FIG. 10.)

The above sequence of tasks is compatible with many conventional aspects of modern high-performance processors. As used herein, a "high performance" processor is one that executes instructions speculatively and out of order and operates at a high frequency (i.e., at least a 2 GHz processor core clocking frequency). Typically, a high-performance processor uses virtual addresses, requiring completion of the first and second tasks. The processor uses a translation lookaside buffer (TLB) to provide the physical address and permission bits corresponding to the virtual address. When the virtual address is not in the TLB, a tablewalk is performed to retrieve the physical address as well as the permission bits.

A conventional high-performance processor includes a store queue (SQ) in which load data address portions (e.g., the lower 12 bits, which are the same for both virtual and physical addresses) are cammed against the corresponding store data address portions. To thwart or prevent SCAs, this circuitry would be modified or supplemented to compare the entire physical addresses using a wide comparator circuit. Though within the scope of the broadest characterizations of the invention, this embodiment leaves something to be desired. For complete physical address comparisons, the second and third tasks' relatively time-consuming processes would become a critical path for execution, one that could not—in a high-frequency (i.e., 2+ GHz), four or five-cycle execution processor—be completed before speculative STLF. This drawback would be a significant deterrent against this approach.

The fourth and fifth tasks also take a significant amount of circuitry, energy, and time because they require comparators to compare the virtual and/or complete physical load data address with the virtual and/or complete physical data address of potentially many different stores. These tasks are complicated by the facts that loads and stores may have different access sizes (e.g., anywhere from 1 to 8 bytes), have different starting addresses, and straddle cache line boundaries. Altogether, without some speculation about whether a store and load designate the same data address, the many tasks above would require more than four or five pipe stages in a high-frequency processor.

Incremental Speed Enhancing Adaptations

As stated earlier, the embodiments presented herein generally condition STLF upon an assurance, at least, that the complete physical load and store data addresses match. As discussed above, this may involve a comparison of the complete physical load and store data addresses, which under conventional approaches would lengthen load-to-use latencies. While longer load-to-use latencies may be suitable for some niche architectures and applications, they are not suitable for all. Accordingly, incremental improvements are described herein—including a memory dependence predictor, the use of a virtual level-one cache and way select directory in the cache—that lower the amount of time to complete a physical data address comparison.

Incidentally, "low load-to-use latency" is hereby defined as no more than 4-5 clock cycles from load execution to load use, not including scheduling or fetching operands. Counting begins when the load data address starts being calculated using load operands. Use occurs when a subsequent instruction uses the data.

To enable SCA mitigation based on matching physical data addresses to be done in the context of a high-performance, super-scalar, out-of-order, speculative execution, high-frequency (i.e., clock cycle 2 GHz) processor, and especially processors preserving low load-to-use latency, this specification describes several adaptations to the cache architecture, inter-cache communication, and the use of a memory dependence predictor to speed up the comparison.

In one embodiment, matching data address verification is accomplished much more quickly by comparing shortened substitutes (proxies) of the load's and store's complete physical data addresses. STLF is conditioned upon the proxies matching, which are designed to match whenever but only if the complete physical load and store addresses match. Additional incremental timing improvements are obtained through the use of a cache way select directory to more rapidly retrieve these proxies for comparison and the use of a memory dependence predictor to reduce delays in camming load data addresses against SQ entries.

Embodiments are also presented for also verifying that the load and store have satisfactory permissions for their operations on the load or store data, that the load and store virtual data addresses have valid translations, and that the load instruction gets all its data bytes from the store instruction. These are additional conditions on STLF that mitigate against SCAs.

While multiple adaptations are described to speed up verifications that physical data addresses match, the invention is not limited to embodiments that employ all or even any particular set of these improvements. Depending on a processor's design constraints, it may not be necessary to implement all or even any given one of the improvements described herein.

An Introduction to Certain Cache-Related Terminology

This section is intended to bring clarity to certain concepts and terms used in this specification that relate to caches. It is important to be mindful of various colloquialisms within the microprocessor art. Cache entries may be characterized as "having," "holding," "containing," "being associated with," "corresponding to," or "representing" an address, or reference may be made to the "address of" the cache entry. The address in each of these characterizations is presumed to be the address of the data of the entry, i.e., the location in main memory from or to which the data was sourced or is destined to be stored. The "address" is not to be understood, unless the context makes it so, as the location of the cache entry itself, which location is accessed by a set index and way selection bits.

A cache entry need not hold all the address bits of a main memory address (virtual or physical) within a tag. Typically, some bits of such an address are implicit by virtue of the metadata of the entry, such as the set index bits used to locate the cache entry. Inclusion of those bits in the tag itself would be redundant. Accordingly, unless a reference in this specification to a physical address is clearly a "complete physical address," a reference to a "physical address" is inclusive of representations that skip bits that are implied by the metadata of the entry and/or which are otherwise implicitly discoverable.

For example, one embodiment employs a partially or fully virtual level-one data (DL1) cache and a fully inclusive physically level-two data (DL2) cache, both of which are set-associative caches. The way the DL1 cache relates to the DL2 cache implicitly reveals a portion of the physical addresses corresponding to the load and store virtual addresses, enabling a reduction in the number of bit comparisons needed to effectively compare physical addresses.

Also, since the DL1 and DL2 caches are different in size, with differing numbers of set index bits, the size of their respective cache tags will be different. Because the DL2 cache is generally larger and has more sets than the DL1 cache, its tag entries require fewer address bits than the DL1 entry. Also, in an inclusive cache setup, there will always be a DL2 cache entry corresponding to a DL1 cache entry, meaning that they both cache the data of a common memory address. Therefore, a DL2 cache entry is properly characterized as having the same "address" as a DL1 cache entry without having the same number of bits. "Logically matching" means that the DL1 and DL2 cache entries' addresses, though differently represented, refer to the same address in main memory.

A typical set-associative cache is made up of a plurality of entries, each which can be accessed by a set index and way selection bits. Each entry has a tag that holds information sufficient to identify the main memory address of the data that the entry holds. The tag may also hold other data, including for example, a virtual address corresponding to the physical address. Collectively, the tags of the cache form what is referred to as the tag RAM.

In a traditional n-way set-associative cache lookup, 2n large VA tags are read out of the cache's tag RAM and compared with the corresponding bits of the lookup VA to determine a hit or miss. In one embodiment, the DL1 cache is improved with a secondary directory referred to herein as a Way Select Directory ("WaySelDir"). The WaySelDir is organized like the tag RAM, with the same number of sets and ways. The WaySelDir caches hashed partial virtual tags (HPVTs) that require much smaller entries than the tag RAM. These provide a faster way to determine a cache hit or miss than the prior art. The WaySelDir is also utilized to partially identify a set and identify a way of a lower (DL2) set-associative cache. The bits used to identify the set and way could alternatively be held in the tag RAM, but according to one embodiment, it is advantageous to break out that portion of memory from the tag RAM to hold just the partial set bits, way select bits and/or to perhaps also hold a few other choice bits (e.g., permission and valid translation bits). The WaySelDir's tags use hashes of virtual addresses instead of complete virtual addresses. Therefore, the WaySelDir is relatively small, allowing it to be accessed more quickly than the tag RAM.

The memory holding the actual cache data, the tag bits, and the WaySelDir bits can be logically and even physically separated from each other. They may even have their own selection circuits for selecting an entry. Nevertheless, it remains convenient to refer to all these bits, for a given address, as belonging to a common cache "entry." Therefore, it will be understood that to the extent the claims refer to a cache entry, it may refer to data bits, tag bits, and/or WaySelDir bits. Also, at times it may be convenient to refer to a "tag RAM entry" or a "WaySelDir entry." It will be understood that such entries are still logically linked together by common set index and way select bits. They collectively form (in at least a logical sense) what has long been colloquially referred to as a common "entry" of the cache.

Traditionally, the industry has avoided the use of virtual caches because they create problems with cache coherency and TLB consistency that require complex solutions. When they have been used, virtual caches provide fast access to data but do not cache the physical data addresses. Therefore, a miss in the virtual cache necessitates translating the virtual address to a physical address using the TLB.

In one embodiment, a virtual level-one data cache is adapted to cache not only the data but also a physical address, or a physical address equivalent, of the data. The physical address or equivalent is used to access a physical level-two data (DL2) cache. Even more significantly, for purposes of this description, the physical address is used to verify physical address matching prior to speculative store-to-load forwarding (STLF). This technique benefits from the fact that the load and store are necessarily fetched into the cache in order to be executed, which is typically done many cycles before execution.

Physical Address Equivalents, E.g., Proxies

A complete-address comparison compares the complete physical addresses (e.g., 52 bits implemented for a 64-bit architecture) of the load data and the store data to verify that they are the same. A comparison of that many bits requires several layers of cascaded comparator logic and several clock cycles, meaning that the execution pipeline may need to be lengthened from the 4 or 5 clock cycles commonly achieved in the industry.

Accordingly, in one embodiment, a functionally equivalent substitute for a complete physical data address (CPDA) comparison is developed. This adaptation virtually caches level one data and utilizes physical data address equivalents (PDAEs) in place of CPDAs. The PDAEs permit comparisons of equivalents of the physical addresses in place of CPDA comparisons while yielding the same results with equal accuracy and reliability. Examples include fully decryptable encrypted versions of the physical addresses and hashed versions as well, provided that the risk of aliasing is sufficiently minimized and/or made unpredictable. While some equivalents are the same in length, other equivalents may be much shorter, and much faster to compare, than the complete physical addresses.

One category of PDAEs is what are referred to herein as "physical address proxies" (PaPs). The term "proxy" is apt because the proxy represents the complete physical address and functions as a functionally equivalent substitute to the complete physical address. The proxy, by reason of the rules or circumstances that dictate the proxy's location or relationship to another structure or value, provides all the information needed to accurately and reliably derive the complete physical address.

In one implementation, PaPs—in some cases together with other readily available information such as the virtual address—function as pointers from a level one data cache (DL1) that is at least virtually indexed (and either physically or virtually tagged) to a fully inclusive DL2 cache that is physically indexed and tagged.

PaPs are referenced in connection with the drawings in FIGS. 4 and 6-9. It is conducive to the understanding of this application to describe PaPs in introductory detail in this prefatory portion before describing them in their overall context in FIGS. 4 and 6 and their bitwise arrangements and relationships in FIGS. 7-9.

Applicant originally conceived PaPs to improve snooping and coherency operations on a virtual level one cache, as discussed in U.S. patent application Ser. No. 17/315,262, filed May 7, 2021, which is herein incorporated by reference. There is a need to efficiently invalidate cache lines in the DL1 cache when a corresponding physical DL2 cache line was invalided as a result of a snoop. To meet this need, Applicant devised a backpointer that is much shorter than the complete physical data address to point from a DL1 cache line or entry to a DL2 cache line or entry for cache coherency purposes. The backpointer is stored with each DL1 cache line or entry or in a parallel data structure to the DL1. The backpointer provides all the information necessary to locate a DL2 cache line or entry corresponding to the DL1 entry. When paired with a virtual DL1 and physical DL2 as described in this application, this enables the backpointers to be used as physical address proxies. When the backpointers of the DL1 cache entries of a load and store pair match, the physical data addresses of that pair also necessarily match. Accordingly, these backpointers have applications not only for cache coherency operations but also as proxies for the complete physical address (PaP).

For example, consider a processor that implements 52 address bits of a 64-bit architecture and has a 64 KB virtual DL1 cache and a 512 KB physical DL2 cache with 2048 sets and 4 ways. The lowest 6 bits [5:0] of the physical address determine a byte offset inside a 64-byte DL2 cache line, and the next 11 bits [16:6] specify the set index into the DL2 cache. Any given memory address can only be cached in one set (4 different possible entries for 4 ways) of the DL2 cache. A total of 13 bits (6 untranslated set bits, 5 translated set bits, and 2 way bits)—referred to herein as a PaP—fully determine which DL2 cache entry any given cached memory line is located. A total of 19 bits (the PaP plus 6 byte offset bits)—referred to herein as an extended PaP—fully determine which byte of which DL2 cache entry any given cached memory byte is located. By storing the PaP or extended PaP in a DL1 cache line, one can immediately identify the DL2 entry that is inclusive of (references the same memory address as) the DL2 cache entry. Because the remainder of the memory address is stored in a tag of the DL2 entry, the identification of a DL2 entry is indirectly an identification of a particular physical memory line address.

Certain characteristics of the DL2 cache render the PaP a proxy of the complete physical address. The DL2 cache is mapped one-to-many to the physical memory. Because the DL2 cache is mapped one-to-many to the physical memory, multiple physical memory addresses can be allocated to a given data level-two cache entry. A PaP may be a proxy for any of those multiple physical memory addresses. The physical memory address held in the DL2 cache entry determines which of those multiple physical memory addresses is associated with the PaP.

On the other hand, the set-associative structure and cache allocation policy of the DL2 dictates that at any given time, only a single data level-two cache entry can be allocated to a given physical memory address. Over time, a given DL2 cache entry may be allocated to any of many different physical memory addresses having the same lower address bits [16:6]. But the set-associative structure determines to which set a given physical memory address will be allocated. That is, there is only one set of the DL2 cache—the set dictated by bits [16:6]—to which any given physical memory address can be allocated. Moreover, the cache allocation policy, which determines which way a given physical memory address will be allocated, will not permit any given physical memory address to be allocated to more than one valid DL2 cache entry at any given time. For that reason, only a single data level-two entry can be associated with any given PaP.

Because each non-invalidated DL2 cache entry is allocated to a single determinable physical memory address, the PaP points to information sufficient to reveal the physical address. If the PaPs of the load and store data addresses are the same and neither of the cache entries have been overwritten, then the complete physical load and store data addresses are necessarily the same. This makes a PaP a proxy of a physical memory address.

Certain characteristics of the DL1 cache make it possible for a rapid comparison of PaPs to substitute for a slow comparison of CPDAs. One is the fact that the DL1 cache is virtual (i.e., accessed via virtual address bits), and another is the fact that each virtual DL1 cache entry contains a PaP. Because the DL1 cache is virtual, no physical address translation is needed to access it. This is much faster, but it comes at a cost. A given physical address can alias into two or more different virtual addresses. Therefore, a discovery that a load's and store's virtual data addresses do not match is insufficient to rule out the possibility that the physical data addresses match. Fortunately, the DL1 is constructed to store a PaP with each DL1 cache entry. The PaP for any given physical memory address will always be the same no matter how many virtual entries into which it is aliased. Thus, even if the load and store virtual data addresses are different, a lookup of the PaPs associated with the load and store's DL1 cache entries will be the same if the physical data addresses corresponding to the virtual data addresses are the same. Thus, a comparison of the PaPs or extended PaPs of a load's and store's physical data addresses is equivalent to a comparison of the load's and store's CPDAs.

Because of the nature of conventional virtual addressing schemes—to translate only the upper n-12 bits of a physical address into a virtual address—the use of PaPs can be made even more efficient than as discussed above, where bits [11:6] and maybe also [5:0] are compared together with bits [16:12] and the way select bits. As bits [11:0] of the virtual data address are the same as bits [11:0] of the physical data address, there is no need to retrieve the lower 12 bits of two physical addresses for comparison when retrieval and comparison of the lower 12 identical bits of the virtual addresses is more readily available and can be done even earlier. Therefore, assuming that the lower 12 bits of the virtual addresses have been confirmed to match (which can be done without any TLB translation), comparisons of diminutive PaPs of 7 bits each (5 translated set bits [16:2] plus 2 way select bits) suffice to determine whether the CPDAs match.

A comparison of 7 bits (plus one additional bit representing the outcome of a prior comparison of virtual bits [11:0]) uses only 4 levels of cascading comparators, a striking reduction from the 7 levels needed for comparing 40 translated bits in a conventional 64-bit architecture. The comparison of 7 bits also uses considerably fewer comparators, transistors, chip real estate, and power than does a comparison of 52 bits.

Accordingly, one distinguishing feature of PaPs according to the above implementation is that each PaP includes some but not all bits of the corresponding complete physical data address and one or more non-address bits that aid in identifying an associated entry in an inclusive level-two data cache. Another distinguishing feature of PaPs according to the above implementation is that the entry and/or metadata about the entry in which the PaP is held reveals other bits of the complete physical data addresses.

Different cache architectures might call for a different number of bits to go into the PaP. For example, a processor with a smaller, 256 KB DL2 cache with 1024 sets and 4 ways would have one-half the sets described above and need only 10 bits, total, to index those sets. In such a case, a PaP of 6 bits, plus the upper 6 untranslated bits, would suffice to accurately and reliably identify a DL2 cache entry. A processor with a large 1 MB DL2 cache with 2056 sets and 8 ways would need 11 bits, total, to index those sets, and 3 bits to identify the way. In such a case, a PaP of 8 bits, plus the upper 6 untranslated bits, would suffice to accurately and reliably identify the DL2 cache entry.

Generalizing the examples above, a PaP will have m bits, where m=the bit location of the highest address bit used for the cache set index (e.g., bit 16 of PA[16:6]) minus the number of untranslated bits (e.g., PA[11:0]=12 untranslated bits), plus the number of bits needed to select a way (e.g., 2 bits for a 4-way set-associative cache).

The expediency of this approach to physical address matching depends on the load and store data addresses hitting in the DL1 cache. As lines or bytes of memory are brought into the DL1 cache, the corresponding PaPs are recorded in the corresponding DL1 cache tags. If a load or store data address does not hit in the DL1 cache, the instruction is aborted, the data fetched into the cache, and the instruction replayed. As fetching before executing loads and stores is conventionally required anyway, this aspect of the process does not impose any new performance penalty on the address comparison.

It should be noted that the association between the PaP and the specific memory location is only temporary. For a given PaP, this uniqueness terminates if and when the PaP's data level-one cache entry is overwritten. Over time, the same PaP will not necessarily correspond to the same physical location. Therefore, measures—which are not the subject of this application—are advised to prevent comparisons between old and new PaPs.

With These Improvements, How is STLF Still Speculative?

The foregoing adaptations enable speculative STLF to be more accurate and reliable while completing quickly enough to achieve cutting-edge load-to-use latencies in modern high-performance processors. One might ask how is the processor speculating if the complete physical addresses have been compared and the permission bits checked? There are many other assumptions that a processor may make about an instruction that open possibilities that the instruction will later abort, rendering a pre-abort operation on that instruction speculative. For example, an uncommitted older instruction could cause an exception, forcing it and/or all instructions newer than that instruction to abort. As another example, calculations on load or store operands to determine the load or store address may themselves depend on some uncommitted instruction. In short, a STLF operation may be speculative for a variety of reasons besides the facts that the physical load and store data addresses might not match, or the load and store instructions might lack the proper permissions.

Figure 1:
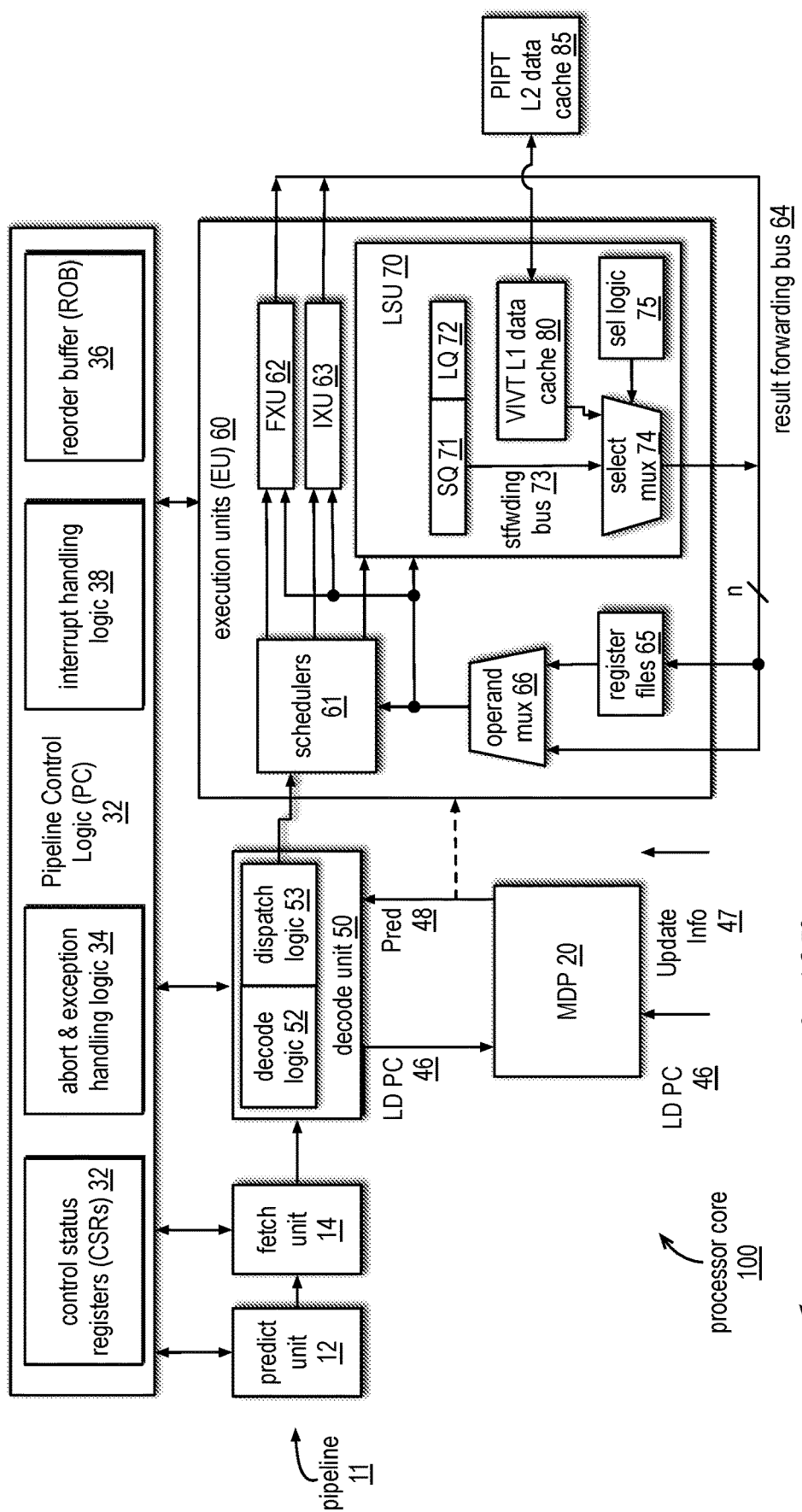
FIG. 1 is a block diagram of one embodiment of a pipeline of a processor core of a processor adapted for conditioning store-to-load forwarding on the complete physical addresses of a load and store matching.

Processor Core Overview (FIG. 1)

Having completed the foregoing definitional and explanatory context, the drawings are now described in detail. FIGS. 1-9 depict several embodiments of microprocessor logic in which a determination that the physical load and store addresses match is used to condition store-to-load forwarding (STLF). FIG. 1 is a block diagram of one embodiment of a pipelined super-scalar, out-of-order speculative executing, high-performance microprocessor core 100. The core 100, which may the only core of a single-core processor or be one of several cores of a multi-cored processor 10, performs speculative execution of instructions.

The core 100 comprises a multi-stage processor pipeline 11 having a plurality of pipeline units or stages. The processor pipeline 11 includes a predict unit (PRU) 12, an instruction fetch unit (IFU) 14, a decode unit (DEC) 50, and execution units (EU) 60, that respectively predict, fetch, decode and execute instructions. The PRU 12, IFU 14, DEC 50, and EUs 60, along with intervening FIFOs (not shown), form a concatenated pipeline 11 in which instructions and Ops are processed in mostly sequential stages, advancing each clock cycle from one stage to the next. Each stage works on different instructions in parallel.

Each of these units are controlled by and in two-way communication with the pipeline control logic (PCL) 32. The PCL 32 regulates and coordinates the advancement of instructions through the pipeline 11. It comprises a ReOrder Buffer (ROB) 36, interrupt handling logic 38, and/or abort-handling logic 34. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op. The PCL 32 also includes control and status registers (CSRs) 90 such as described in co-pending U.S. patent application Ser. No. 17/005,309, filed Aug. 27, 2020, which is herein incorporated by reference.

The execution units 60 comprise at least one scheduler 61, operand mux 66, instruction execution unit (IXU) 63, floating point execution unit (FXU) 62, and load-store unit (LSU) 70. The schedulers 61 issue instructions out of order to the IXU 63, FXU 62, and LSU 70. A result forwarding bus 64 forwards results from each of these units 62, 63 and 70 to one or more register files 65 and operand multiplexers (muxes) 66. The operand muxes 66 select values from the result forwarding bus 64 and register files 65 to feed the operands of the instructions issued to units 62, 63 and 70.

The LSU 70 comprises a level one set-associative data (DL1) cache 80 and some type of SQ 71 and LQ 72 or a unitary store and load queue. The LSU 70 also includes selection logic 75 controlling a select mux 74 that selects one of several inputs, including a store forwarding bus 64 and a cache data bus from the DL1 cache 80, to put data onto a result forwarding bus 64.

The DL1 cache 80 is preferably virtual and is structured like the DL1 cache discussed in the prefatory portion of this specification. The processor also includes a DL2 cache 85 that is preferably physical, inclusive of the DL1 cache 80, and configured like the DL2 cache discussed in the prefatory portion of the specification.

An important innovation of the DL1 cache 80 is its configuration to translate virtual addresses into physical addresses. Instead of using a time-consuming TLB lookup and potential table walk to translate the virtual load and store data addresses to physical load and store data addresses, the DL1 is virtual. Because the DL1 is virtual, a virtual address directly accesses DL1 entry that contains a tag (part of the tag RAM) that holds a PDAE for the virtual address. Therefore, the virtual DL1 cache replaces the function of—and potentially also the need for—a L1 TLB. Advantageously, translating a virtual data address into a physical one is as easy—and fast—as looking it up in the cache.

In a further improvement, the physical data address or equivalent could be stored in a Way Select Directory ("WaySelDir") that is separate from—and faster than—the tag RAM. The WaySelDir—which is referred to in others of Applicant's pending applications as a "hashed tag array" or "hashed address array"—is a hashed tag array that holds a hashed tag (i.e., a hash of the virtual data address with or without other bits) and PDAE associated with each of the entries of the DL1. The WaySelDir also stores permission and validity bits associated with the data. The WaySelDir need not contain all the information stored in the tag RAM. Also, the WaySelDir uses hashed partial virtual tags (HPVTs), discussed in U.S. patent application Ser. No. 17/185,765, filed Feb. 21, 2021 (which is herein incorporated by reference), rather than complete physical addresses, to access the WaySelDir. Therefore, translation via the WaySelDir is modestly faster than translation via the tag RAM.

After load and stores are fetched into instruction cache, their virtual addresses are calculated using operands of the loads and stores. After their virtual data addresses are calculated, lookups are made in the DL1 cache to find out a load or store instruction's data is present. If not, the load's or store's physical data address or equivalent is fetched into the virtual DL1 data cache and the instruction is reissued or replayed. When a DL1 cache line or entry is filled, the physical data address or some PDAE thereof (e.g., the PaP) is written into a tag or way select directory for the line or entry. Therefore, when a lookup of the DL1 cache is performed and results in a hit, the physical data address or PDAE is obtained. In one implementation, the retrieved physical data address or PDAE is stored in an appropriate SQ or LQ entry after it is obtained from the DL1 cache. After an LQ entry is provisionally matched (by the MDP or other prediction mechanism) with a SQ entry, the stored physical data addresses or PDAEs are compared to determine whether to permit STLF from the store to the load.

The load queue (LQ) 72 and store queue (SQ) 71 hold speculatively executed load/store Ops until the Op is committed. More specifically, the LQ 72 holds a load operation until it is committed, and the SQ 71 holds a store operation until it is committed. In one embodiment, the load and store queues are combined into a single memory queue structure rather than separate queues.

The DEC 50 allocates an entry of the LQ 72 or SQ 71 in response to decode of a load/store instruction. The load data address is used to access and update the SQ 71. Once data for a store is determined, the store data is and is stored in the SQ 71. Likewise, once the store's data address is determined (as it might need to be calculated from operands), the data address (virtual and/or physical and/or some equivalent) is also stored in the SQ 71. The SQ 71 may also store other metadata (e.g., a ROB identifier) about the store data and/or store instruction. The LQ 72 stores metadata about the load instruction.

When a load is executed whose physical data address has been determined or at least predicted to match, store-to-load forwarding circuitry forwards store data from the SQ 71 to dependent load Ops. In one implementation, the SQ 71 identifies the forwarding store by camming a load data address against entries of the SQ 71 to find a matching entry.

Prior to committing a load/store Op, the LQ 72 and SQ 71 may be used to check for store forwarding violations. The LQ 72 stores metadata indicating whether a store-to-load forwarding operation was correct and succeeded. Additionally, the LQ metadata indicates whether there was any forwardable uncommitted store data for a load for which no forwarding was attempted. If data was mis-speculatively forwarded from an incorrect SQ entry, the LQ metadata identifies a correct SQ entry, if any, providing forwardable store data to a load for which. When a store Op is finally committed, the store data held in the associated SQ 71 entry is written into the data cache 80 at the store address held in the SQ 71 entry.

FIG. 1 also depicts a memory dependence predictor (MDP) 20. The MDP 20 predicts whether store data from an uncommitted store instruction is available to forward to a load instruction. In one implementation, the predictions are history-based, honed over thousands of cycles of data recording when loads should have and should not have forwarded from a store. In one implementation, for any given load instruction, the MDP 20 predicts which store or SQ entry, if any, is likely to provide valid forwarding data. In an alternative implementation, the MDP 20 predicts, for each SQ entry, the likelihood that that store entry will provide valid forwarding data. For example, a 4-bit likelihood factor may be provided for each SQ entry indicating the forecast probability that the entry will supply valid forwarding data to the load.

In one implementation, the MDP 20 eliminates any need for camming by predicting which store queue entry will have a matching store. Alternatively, the MDP 20 reduces the complexity of any camming by identifying a narrow set of SQ entries with which to cam the load data address, as set forth in U.S. patent application Ser. No. 17/351,946, filed Jun. 18, 2021, which is herein incorporated by reference. Camming is then limited to a prioritized set of SQ entries that meet some threshold criteria (e.g., >15% chance of providing valid forwarding data; being among the top 4 highest probability forwarding candidates; etc.).

To provide insight into the ordering and timing of certain events of one implementation of the MDP 20, FIG. 1 illustrates the decode unit 50 as comprising decode logic 52 and dispatch logic 53. The decode logic 50 decodes architectural machine instructions into microarchitectural instruction ops ("Ops") that the EUs 114 execute. In one implementation, the MDP 20 is accessed concurrently with the decode and/or translation of an architectural instruction into an Op. Once the DEC 50 discovers that an instruction being decoded is a load instruction, the DEC 50 uses the PC 242 of the instruction to access the MDP 20 to predict whether uncommitted store data can be forwarded to the load. If the prediction is that forwarding is possible, then the MDP 20 outputs information 48 that predictively identifies which uncommitted store instruction(s) is/are most likely to provide forwardable data.

The MDP 20 may be characterized either as a part of the DEC 50, a part of the LSU 70, bridging both the DEC 50 and LSU 70, or as logic existing astride the DEC 50 and LSU 70. During the translation stage, the decode unit 50 accesses the MDP 20 using the PC 246 of a load instruction to obtain a prediction 22 of whether uncommitted store data is available to forward to the load instruction. The LD PC 46 is used to not only obtain the prediction 48 from the MDP 20 (represented by the arrows above MDP 20 block), but also update the MDP 20 (represented by the arrows below the MDP 20 block). The information 47 used to update the MDP 20 is sourced by or derived from the SQ 71 and LQ 72.

The dispatch logic 53 selects an execution unit to execute and instruction and dispatches it, in program order, from the decode unit 50 to a scheduler 61 for the selected unit. The dispatch logic 53 may also dispatch the prediction 48 obtained from the MDP 20, which is used to select the SQ 18 entry or entries with which to perform comparisons of the CPDAs or PDAEs.

The core 100 provides virtual memory support. Each process, or thread, running on the core 100 may have its own address space identified by an address space identifier (ASID). The core 100 may use the ASID to perform address translation. For example, the ASID may be associated with the page tables of a process. Translation lookaside buffers (TLBs)—for example a data TLB and an instruction TLB—may include the ASID in their tags in order to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags in order to distinguish entries for different virtual machines. Finally, the core 100 provides different privilege modes (PM), or privilege levels. The PM of the core 100 determines, among other things, whether privileged instructions may be executed.

It is emphasized that many of the elements of FIG. 1 are depicted for context and to provide one example of a specific processor core/pipeline embodiment to which various novel aspects disclosed herein may be applied. Not all the depicted structures are necessary, and some elements could be modified, added, combined, substituted and/or eliminated in alternative embodiments. Also, it is to be understood that the block diagram of FIG. 1 does not imply a strict demarcation of what each unit does or a strict structural separation between the units shown. Some elements are universally understood to be a part of a particular pipeline unit, but others may not be. For example, whether a scheduler is part of a decode unit, an execution unit, a ROB, or is distinct from all three, or whether a MDP is part of the decode unit, a load-store unit, or distinct from both, is determined more by pedagogical convenience than by rigid semantic demarcations.

Figure 2:
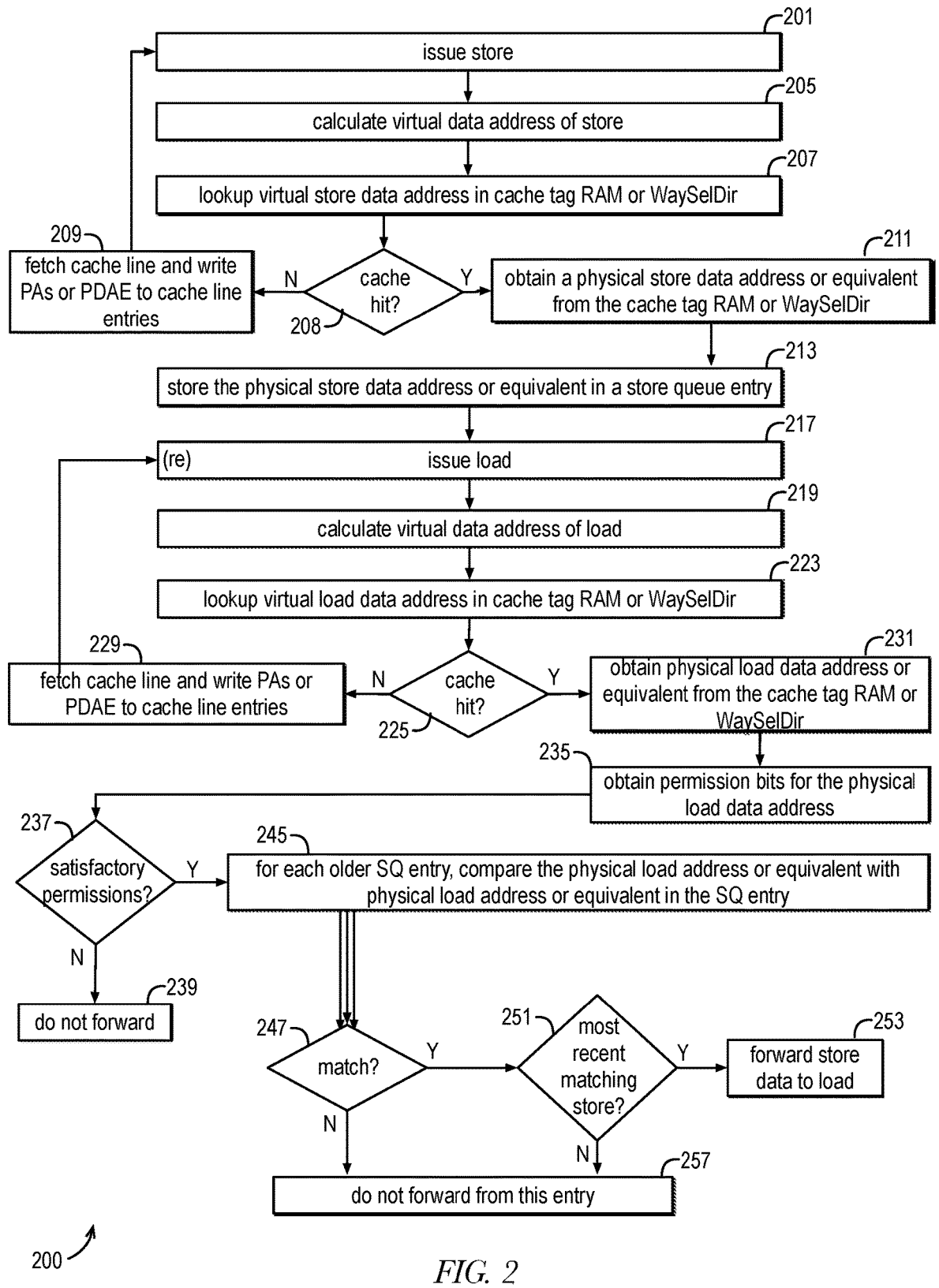
FIG. 2 is a flow chart that illustrates one embodiment of a new architecture to thwart Spectre attacks of the sort illustrated in FIG. 1.

Comparing Physical Load & Store Data Addresses or Equivalents (FIG. 2)

FIG. 2 is a flow chart that illustrates one embodiment of a new architecture to thwart Spectre SCAs of the sort illustrated in FIG. 10. Starting at block 201, the store instruction is issued. In block 205 (which could be configured to be at least partially performed before block 201), the processor 10 calculates the virtual data address of the store as a function of operands of the store instruction.

In block 207, the processor 10 looks up the physical store data address corresponding to the virtual store data address in cache tag RAM or cache Way Select Directory ("WaySelDir"). If the virtual store data address cannot be found in the cache tag RAM or WaySelDir—i.e., there is a cache miss (block 208)—then the data at the physical data address is fetched (block 209), filling a cache line. As the cache line if filled, the physical address or PDAE is written into the corresponding cache line entries. Thereafter, the store instruction is re-issued (block 201).

If there is a cache hit (block 208), then in block 211, the processor 10 obtains the physical store data address or, in one embodiment described further below, a physical data address equivalent, from the TLB, the tag RAM, or the WaySelDir. In block 213, the physical store data address or equivalent of the store instruction is stored in an SQ entry.

Some amount of time after issuing the store instruction (block 201), the processor 10 issues a load instruction (block 217), calculates the virtual data address of the load from its operands (block 219), and looks up the virtual load data address in the cache tag RAM or WaySelDir (block 223). Again, block 217 need not follow block 213; the flow chart is not a timing diagram and will be apparent to persons of ordinary skill in the art that some of the blocks may be reordered.

If the virtual load data address cannot be found in the cache tag RAM or WaySelDir (block 225), then the data at the physical data address is fetched (block 229), filling a cache line. As the cache line if filled, the physical address or PDAE is written into the corresponding cache line entries. Thereafter, the instruction is re-issued (block 217).

Returning to blocks 223 and 225, if the load data address occupies an entry in the cache (i.e., there is a cache hit), then the PC obtains the physical load data address or equivalent from the cache tag RAM or WaySelDir (block 231). The processor 10 also obtains the permission bits for the physical load data address (block 235). Generally, the processor 10 will have already obtained permission bits for the store instruction.

In block 237, the processor 10 examines the permissions of the physical load and store data addresses. If there is a permissions violation with the load and/or store instructions, then the processor 10 prevents the store data from being forwarded to the load instruction. In block 245, the processor 10 also, for each SQ store older than the load whose complete physical store data address or equivalent has been calculated or discovered, compares the complete physical load data address or an equivalent the complete physical store data address or its equivalent. If the load and store instructions' complete physical data addresses do not match (as determined by the above comparison), then the processor 10 prevents the store data from being forwarded to the load (block 257). If in block 247 the addresses do match, it is still important to make sure that corresponding SQ entry holds the most recent instantiation of the store instruction. If not, then in block 257, the processor 10 prevents the store data from being forwarded to the load. But if the addresses do match, and the store is the most recent matching store, then in block 253 the store data is forwarded to the load.

Figure 3:
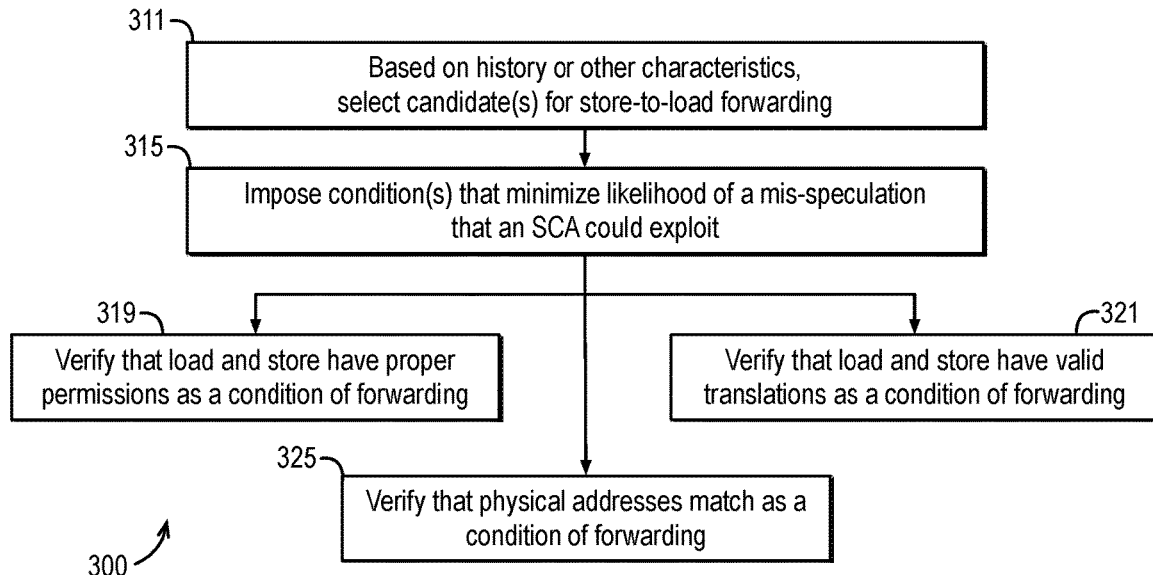
FIG. 3 is a flow chart illustrating one embodiment of a method for thwarting Side Channel Attacks (SCAs) on store to load forwarding.

Introducing Three Preconditions to STLF (FIG. 3)

FIG. 3 is a broad overview of three precautions (blocks 319, 321 & 325) that can be taken, either singly or in combination, before the store data is forwarded, to minimize SCA risks. This list is not exhaustive. Several other actions that can be taken to minimize SCA risks are described in others of the Applicant's applications.

Block 311 precedes blocks 319, 321 and 325. In block 311, the processor selects one or more candidate stores for store-to-load forwarding. One method is to use a memory dependence predictor (MDP) that predicts whether a load will forward and optionally predicts which store queue entry will supply the store data. Alternatively, an MDP might predict the top N stores or SQ entries that are most likely to have a matching physical address and be (have) the most recent matching store.

Selecting the most likely store-to-load forwarding candidate(s) eliminates or reduces the need for temporally expensive camming of the load data address, or a portion thereof, against the store data addresses, or portions thereof, residing in the SQ entries. By assessing and quantifying the probability that different SQ entries will hold a forwarding store, it is possible to winnow down the number of possible store candidates to zero, one or a small plural number. This set of forwarding candidates preferably excludes low-probability store forwarding candidates yet includes enough higher-probability store forwarding candidates to cumulatively increase overall performance. That performance is dependent, in part, on the amount of camming needed, which is based on the number of candidate stores in the set.

It should be noted that a winnowing out of the forwarding store or the most promising store candidates may help enable, but is not necessarily required, for the enablement of, the conditioning of store-to-load forwarding in a high-performance processor on a verification that the complete physical addresses match and that the permissions are satisfied. How many of the improvements, and which ones, that are needed in a high-performance processor depends on various circumstances, including clock frequency and execution staging.

Another action useful in thwarting SCAs is, in block 315, to impose one or more conditions on store-to-load forwarding that minimize the likelihood of a mis-speculation that an SCA could exploit. Block 315 is inclusive of blocks 319, 321 and/or 325, which describe three conditions that may be imposed on STLF. Many other examples of conditions that may be imposed on STLF have been described in U.S. patent application Ser. No. 17/185,165, which is herein incorporated by reference.

Block 325 comprises verifying that the complete physical addresses match as a condition of forwarding forecloses SCAs that attempt to exploit STLF circuity that assumes/predicts that stores and loads with the same N lower address bits are the same. Block 319 comprises verifying that the load and store instructions have proper permissions as a condition of forwarding forecloses SCAs that rely on malicious load instructions that lack the proper permissions. Block 321 comprises verifying that the load and store have valid translations as a condition of forwarding forecloses SCAs that rely on malicious load instructions that do not have valid translations. Any one or combination of blocks 319, 321 and 325 may be employed to thwart an SCA.

Figure 4:
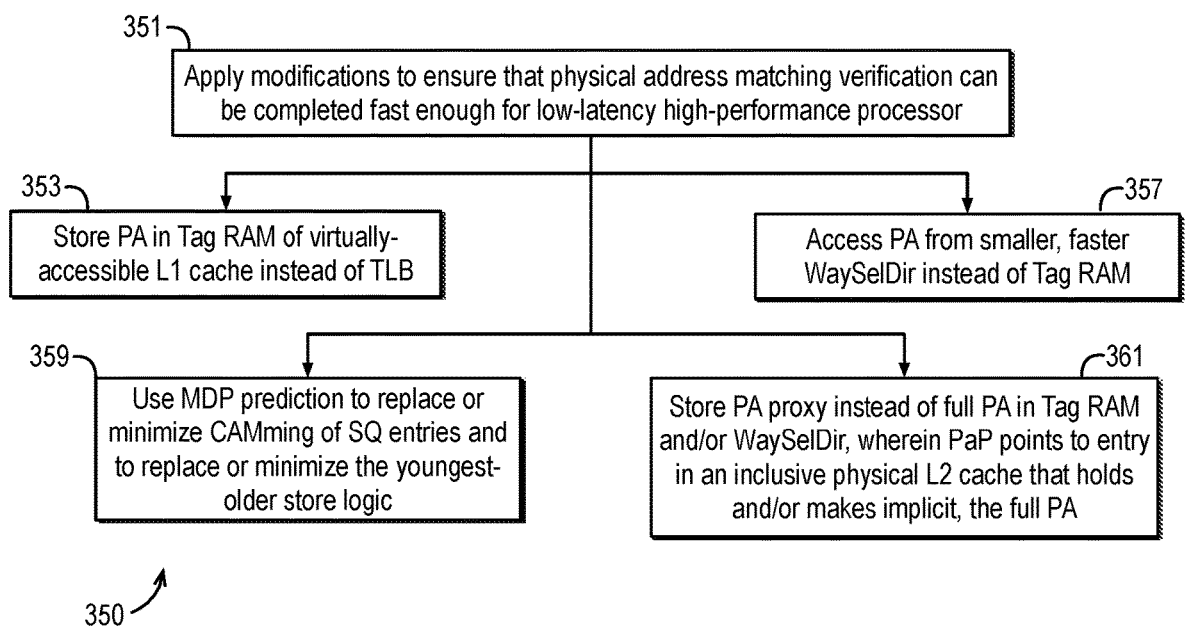
FIG. 4 is a flow chart illustrating various methods for speeding up determinations of whether physical addresses match in order to thwart SCAs with minimal negative impact on performance.

Improving Speed of Condition Verifications (FIG. 4)

FIG. 3 focused on conditions to STLF. FIG. 4 focuses on techniques to speed the evaluation of those conditions in time to perform the STLF. FIG. 4 is a block diagram illustrating various methods for speeding up determinations of whether the complete physical addresses match. In block 351, modifications to the processor architecture are applied to ensure that physical address matching verification can be completed fast enough to maintain low latency in a high-performance processor. Non-exclusive examples of such modifications are illustrated below.

In one embodiment, the processor 10 provides a DL1 cache 80 that is virtually indexed and preferably virtually tagged. In the implementation of block 353, the processor 10 stores the physical address or a PDAE of each load and store in the DL1 cache 80 in a tag RAM of the DL1 cache 80 or in a WaySelDir of the DL1 cache 80.

The processor 10 also preferably provides a physical DL2 cache that is inclusive of the DL1 cache. The inclusivity means that data that exists in a DL1 cache entry necessarily also exists in the DL2 cache entry. Moreover, each non-invalidated DL2 cache entry that contains a cached value from memory holds the physical memory address for that data.

In the implementation of block 357, the complete physical address or PDAE is stored in the WaySelDir, which is smaller and faster than the tag RAM. This results in a modest performance improvement over obtaining translations from a TLB.

In the implementation of block 359, MDP prediction is used to replace or at least minimize camming of SQ entries. If the MDP predicts that a single SQ entry holds the matching store, then the need for camming and logic to identify the youngest older matching store is eliminated. If the MDP predicts instead that a matching store is located in one of two or more candidate SQ entries, the need for camming and the size of the youngest-older matching store identification logic is reduced.

Block 361 illustrates the use of an equivalent of the physical data address (PDAE), rather than the complete physical data address (CDPA), that is stored in the tag RAM and/or WaySelDir. In one embodiment, as described in the prefatory portion of this specification, the PDAE is actually a PA proxy (PaP) that is only a fraction of the size of the complete PA. The PaP is a pointer from a DL1 cache entry to an entry in the DL2 cache that—advantageously—holds and/or makes implicit the complete PA.

As discussed in the prefatory portion, PaPs are unique identifiers of specific physical cache entries within an inclusive cache, as well as of a specific physical location within a physical memory. Use of the PaP takes advantage of the fact that for a store to forward data to a load, both the load data address and the store data address will occupy entries of the DL1 cache. Therefore, the STLF logic can look up any forwarding-eligible load instruction and its candidate store in the DL1 cache 80. Use of the PA proxy also takes advantage of the fact that the PA proxy points to a physical DL2 cache entry that either reveals or makes implicit the complete physical data address. This means that any identical PA proxies stored in the DL1 data will point to the same entry of the DL2 cache entry, which implies that they all have the same physical address. Advantageously, a comparison of PA proxies that are significantly smaller than the complete PAs is much faster, and requires fewer transistors and less power, than a comparison of the complete PAs.

Figure 5:
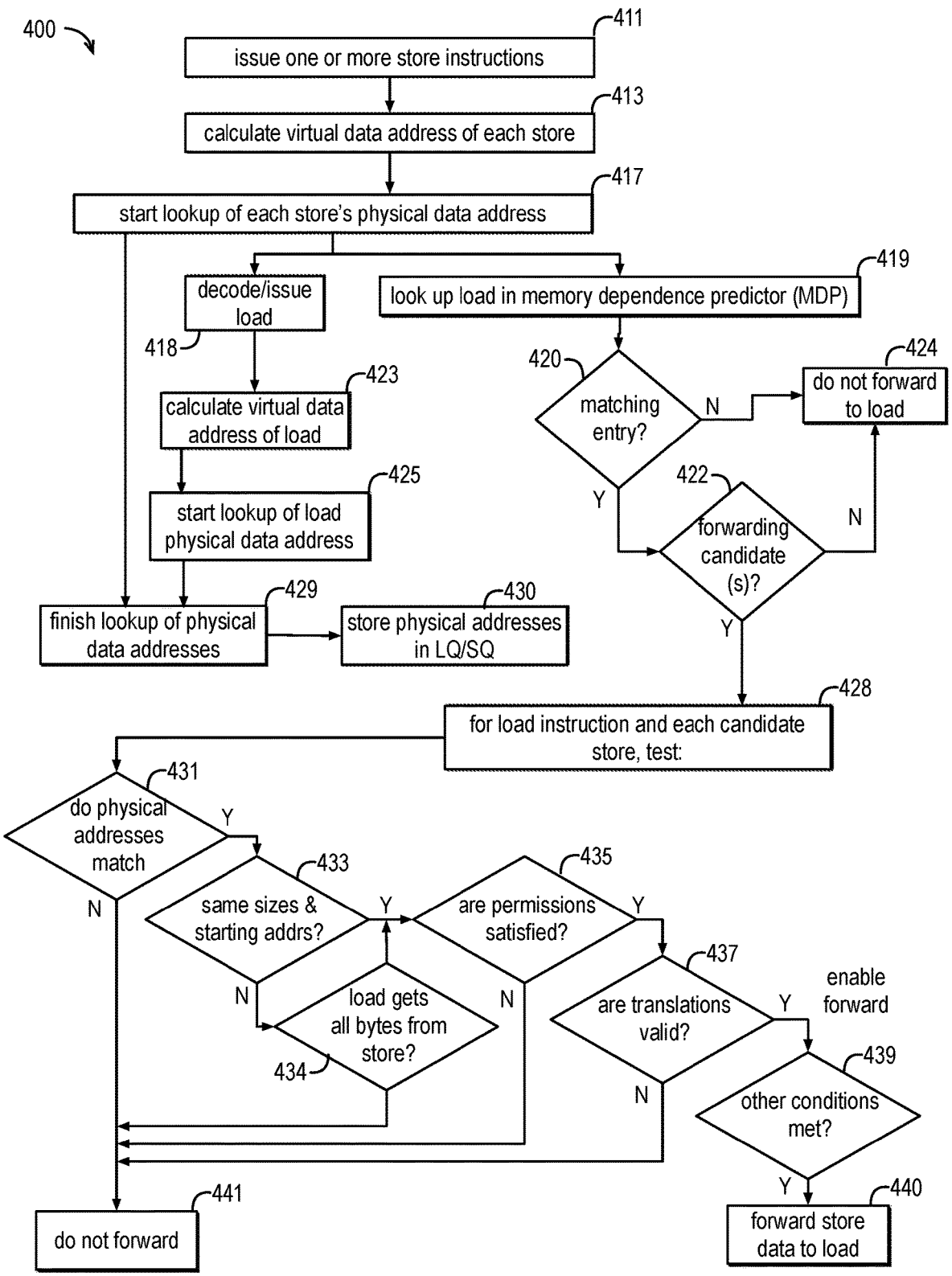
FIG. 5 is a flow chart illustrating one embodiment of a method for thwarting SCAs on store to load forwarding by conditional store-to-load forwarding (STLF) on matching physical load and store data addresses.

Using MDP and Checking Permissions and Validity Bits (FIG. 5)

FIG. 5 is a flow chart illustrating one embodiment of a method for thwarting SCAs on store-to-load forwarding. The method works by verifying that the complete physical addresses match, the permissions are satisfied, and the translations are valid before allowing store-to-load forwarding. The expedience of this verification is aided by an MDP that predicts whether a load will forward from a store and identifies one or more candidate stores for the forward, as described in connection with FIG. 4.

Importantly, FIG. 5 is not limited to implementations that substitute PDAEs for CPDAs, for it will be understood that in some architectures a longer physical address equivalent than a PaP will sufficiently quicken the verification of matching physical addresses to enable address-verified store-to-load forwarding without lengthening the execution clock cycle length. Moreover, FIG. 5 encompasses additional measures—e.g., permission checking—to thwart SCAs.

In block 411, the pipeline 11 issues one or more store instructions ahead of issuing a load instruction. In block 413, the processor 10 calculates the virtual address of each store. For each store, the processor starts looking up the physical data address for each store shortly after the store is issued (block 417). In one embodiment, the lookup is started after the store is decoded and before it is issued. If the lookup is performed by a TLB, the lookup may take a significant amount of time, as illustrated by the arrow connecting blocks 417 and 429. This delay can be reduced by looking up the virtual address in a virtually addressed DL1 cache tag RAM or DL1 cache WaySelDir. Meanwhile, flow also proceeds from block 417 to blocks 418 and 419.

Sometime after issuing the store (block 411), the processor 10 issues a load instruction (block 418), calculates the virtual data address of the load (block 423), and starts a lookup of the load physical data address (block 425). As with looking up the physical store data address, looking up the physical load data address in a TLB could take a significant amount of time. Again, this delay can be reduced by looking up the virtual address in a virtually addressed DL1 cache tag RAM or DL1 cache WaySelDir. Once the physical load and store data addresses and their permissions are obtained, they are stored in the LQ 72 or SQ 71, as appropriate (block 430).

Meanwhile to the decoding and/or issuance of the load (block 418), or shortly thereafter, the load instruction address is looked up in an MDP (block 419). In one embodiment, the MDP s structured to store a plurality of candidate stores in each MDP load instruction entry. The MDP, therefore, can identify a plurality of store-to-load forwarding store candidates for each load instruction occupying an entry of the MDP. The additive probability of finding the right store is thereby increased without a significant time penalty.

In response to a lookup request, a determination is made whether the load instruction (plus translation context or other context, if any) is present in the MDP (block 420). If not, no forwarding is done to that load (block 424). If an MDP entry is occupied by the load instruction but does not list any forwarding store candidates (block 422), then no forwarding is done to that load (block 424). If, however, one or more candidate forwarding stores are listed in the MDP entry (block 422), then the processor 10 performs a set of checks and comparisons for the load and each of the candidate stores (block 428). The set of checks and comparisons verifies whether the physical load and store data addresses match (block 431), have the same starting addresses and sizes (block 433) or at least the load gets all bytes from the store (block 434), the load's and store's permissions are satisfied (block 435), and the translations are valid (block 437). If any of these verifications fails, then no store data is forwarded to the load (block 441). If all the verifications pass, and any other conditions to store-to-load forwarding are met (block 439), then store data is forwarded from the most recent matching store to the load instruction (block 440).

The architecture of FIG. 5 provides advantages over typical architectures that cam the lower 12 bits of a virtual load data address against the lower 12 bits of the virtual store data address in each and every valid SQ entry. First, the architecture of FIG. 5 verifies matching physical addresses, not virtual addresses. Second, the architecture of FIG. 5 verifies that the complete physical load data address matches a complete physical store data address, not just that 12 bits of the load data address match 12 bits of the store data address. Third, the architecture of FIG. 5 predicts and provides one or more candidate stores to compare with the load. This results in a comparison with a limited number of candidate stores that is faster and/or uses less power and circuitry than a camming the physical load data address against all the entries of an SQ.

Figure 6:
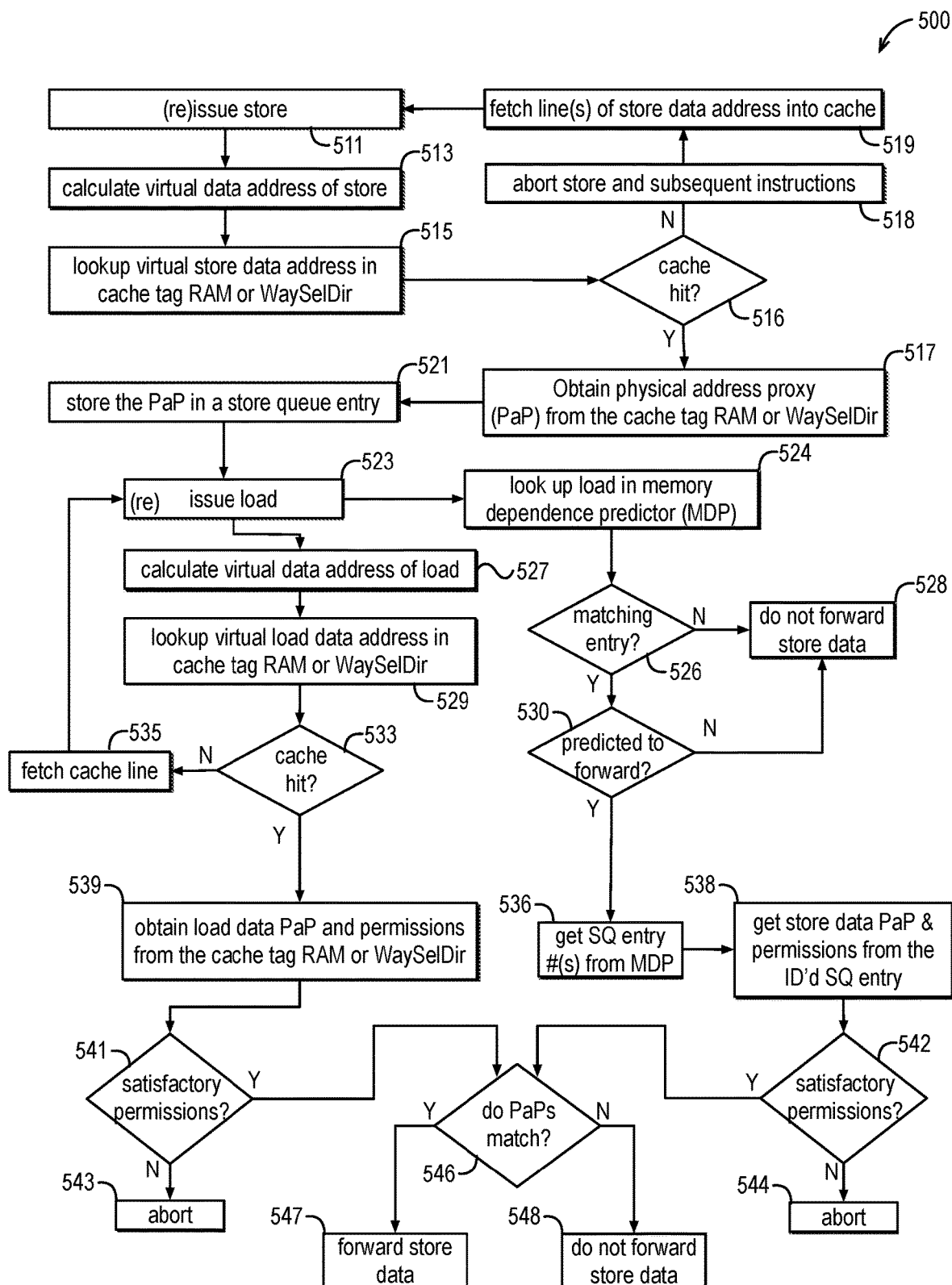
FIG. 6 is a flow chart illustrating a second embodiment of a method for thwarting SCAs on store to load forwarding and using physical access proxies (PaPs) to speed up the process of verifying that the physical load and store data addresses match.

Using PaPs to Expedite Physical Address Matching Verification (FIG. 6)

FIG. 6 is a flow chart illustrating one embodiment of intermeshed address-resolving, STLF, and SCA-thwarting logic 500 that thwarts SCAs by conditioning STLF on a verification that a CPDA of a load instruction matches a CPDA of an uncommitted store instruction. The address-resolving portion of this logic 500 operates on substitutions of not only a virtual DL1 cache for a physical DL1 cache but also a PaP in place of a complete physical addresses. The STLF logic set forth in FIG. 6 speculatively forwards data from the uncommitted store instruction to the load instruction when the load and store's permissions checks are satisfactory and the complete physical data addresses have been verified to match.

The foundation of FIG. 6 is the substitution of physical address equivalents, and more particularly, physical address proxies (PaP), for complete physical addresses. As used in this specification, a physical address equivalent is a substitute for the complete physical address that uniquely identifies the physical address. A conventional virtual address, for example, does not meet this definition because two different virtual addresses can refer to the same physical address at the same time. But a comparison of two physical address equivalents is as accurate as a comparison of the two complete physical addresses for which they substitute.

As discussed in the prefatory portion of this specification, the "complete" physical address generally refers to all the bits of the physical address (e.g., 52 bits in a preferred RISC-V implementation of a 64-bit architecture). An "equivalent" to a complete physical address need not necessarily include the same number of bits as the complete physical address. When the physical address equivalent is significantly smaller than the complete physical address—as it is with a PaP—the number of transistors and clock cycles needed to compare the physical address equivalents can be significantly smaller than the number of transistors and clock cycles needed to compare the complete physical addresses.

Starting at the top of the flow chart, the processor 10 issues one or more store instructions (block 511) ahead of issuing a load instruction. For each store, the processor 10 calculates the virtual data address of the store from its operands (block 513). The processor 10 also looks up the virtual store data address in a cache tag RAM or WaySelDir (block 515). If there is a cache miss (block 516), then the processor 10 aborts the store and subsequent instructions (block 518) and fetches the cache line (block 519). Along with fetching the memory data, the processor 10 also updates the cache line(s) with the proper PaP(s). After the fetch is complete, the processor reissues the store instruction (block 511).

If the store's virtual data address misses in the cache (block 516) the first time the store instruction is issued, then it will hit in the cache after the store instruction is reissued. When the store's virtual data address hits in the cache, the processor 10 obtains the PaP from the cache tag RAM or WaySelDir (block 517). Because the cache line for the store instruction (along with its PaP) now resides in the cache, re-accessing the cache tag RAM or cache WaySelDir with the store's virtual address provides immediate access to the PaP. After the PaP for the store data address has been obtained, the PaP is preferably stored in an SQ entry (block 521).

Sometime after the store is issued, a load instruction is issued (block 523), but not necessarily as late as FIG. 6 suggests. The actions of block 523 and many of the succeeding blocks may temporally overlap one or more of blocks 511-519. The processor 10 begins calculating the virtual data address of the load (block 527) if the calculation has not already been started between the decode and issuance of the load instruction. Meanwhile, a lookup in the MDP is performed of the load instruction address (block 524). Just like the virtual data address calculation, the MDP lookup in an appropriately configured processor can be started before the load is even issued, after the decode of the load instruction.

Attention is now focused on actions performed for the load data address (i.e., blocks 529, 533, 535, 539) before focusing on actions performed by the MDP for the store data address(es). In block 529, the virtual data address of the load, which was calculated in block 527, is looked up in the DL1 cache tag RAM or WaySelDir. If the virtual data address does not exist in the cache, then the cache line is fetched into the cache (block 535) and the load instruction re-issued (block 523). If the virtual data address does hit in the cache (block 533), then the PaP and permissions are obtained from the cache tag RAM or WaySelDir (block 539). If the permissions are satisfactory—e.g., the load has permission to read the load data at the load data address (block 541)—then flow proceeds to block 546, which is described later below. If the permissions are unsatisfactory, then the load instruction is aborted (block 543).

Attention is now returned to block 524 and its descendants, which pertain to the use of an MDP. In block 524, the load instruction address is looked up in the MDP. If the MDP contains no entry for the load instruction (block 526), then no store data—from any store—is forwarded to the load (block 528). Put another way, no initial attempt is made to forward store data to the load. However, if a determination is made that forwardable store data existed but was not used, then the MDP is updated and the load instruction is aborted and reissued. On the other hand, if the MDP contains an entry for the load instruction (i.e., the MDP has been trained for the load instruction), then this is either treated as a prediction of forwarding, or some probability of forwarding is quantified from some heuristic (e.g., past forwarding behavior) and assigned to the load instruction (block 530).

If the load is predicted not to forward from any store, or the measured or predicted probability of forwarding to the load is below some threshold (block 530), then no store data is forwarded to the load (block 528). Otherwise, the load is predicted to store, and one or more SQ entry identifiers are received from the MDP (block 536).

For an MDP that provides only a single SQ entry identifier, this may be loosely characterized as a prediction that the load will forward from the corresponding store. For an MDP that provides multiple SQ entry identifiers, this may be similarly loosely characterized as predicting that the load will forward from one of many corresponding stores. The probability that the load can legally forward from the store is at least somewhat cumulative of the probabilities that the load data address will match a given non-redundant store data address times the probabilities that the load and stores will have the appropriate permissions. The "somewhat" allows for the fact that these probabilities may not be independent.

The SQ entry number(s) received from the MDP (block 536) are used to get the PaPs and permissions from the corresponding SQ entries (block 538). For each load-store candidate pair, the load's and store's respective permissions are evaluated to ensure that they are satisfactory (e.g., write permission to store; read permission to load) (blocks 541 and 542). If the load instruction's permissions are unsatisfactory (block 541), then the load instruction is aborted (block 543). If the store instruction's permissions are unsatisfactory (block 542), then the store instruction is aborted (block 544). Abort of a candidate store instruction will usually result in an abort of all subsequent instructions, including the load instruction.

If a candidate load and store pass their respective permissions checks (blocks 541, 542), then the load PaP is compared with the store PaP. If they match (block 546) and the store is the most recent of the candidate stores, then the store data is forwarded (block 547). If they do not match (block 546), then no data is forwarded from this store to the load (block 548). Actions 541-548 are preferably performed in parallel or pipelined progression for each candidate store received (block 536) from the MDP. They could be performed serially, but this would counteract the efforts described herein to speed up physical address comparisons while maintaining high performance.

Figure 7:
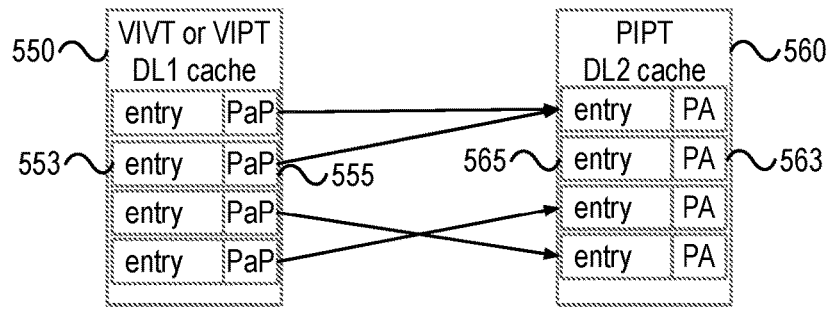
FIG. 7 is a block diagram illustrating one embodiment of a cache architecture—one involving a virtual level-one data (DL1) cache and an inclusive physical level-two data (DL2) cache that facilitates fast PA-match determinations.
Figure 8:
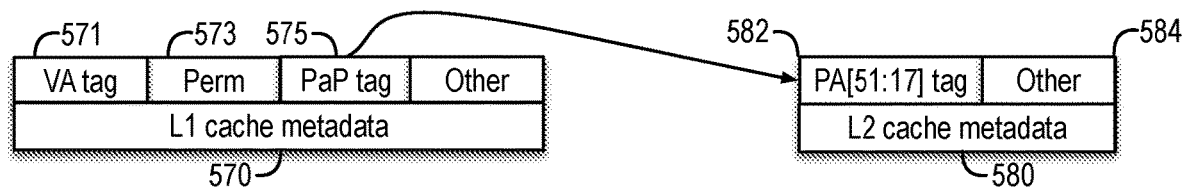
FIG. 8 is a block diagram illustrating how including a pointer in a DL1 virtual cache to an entry in an inclusive DL2 physical cache can be used as an accurate, non-aliasing proxy of a complete physical address, significantly reducing the number of bits that need be compared to verify matching PAs.
Figure 9:
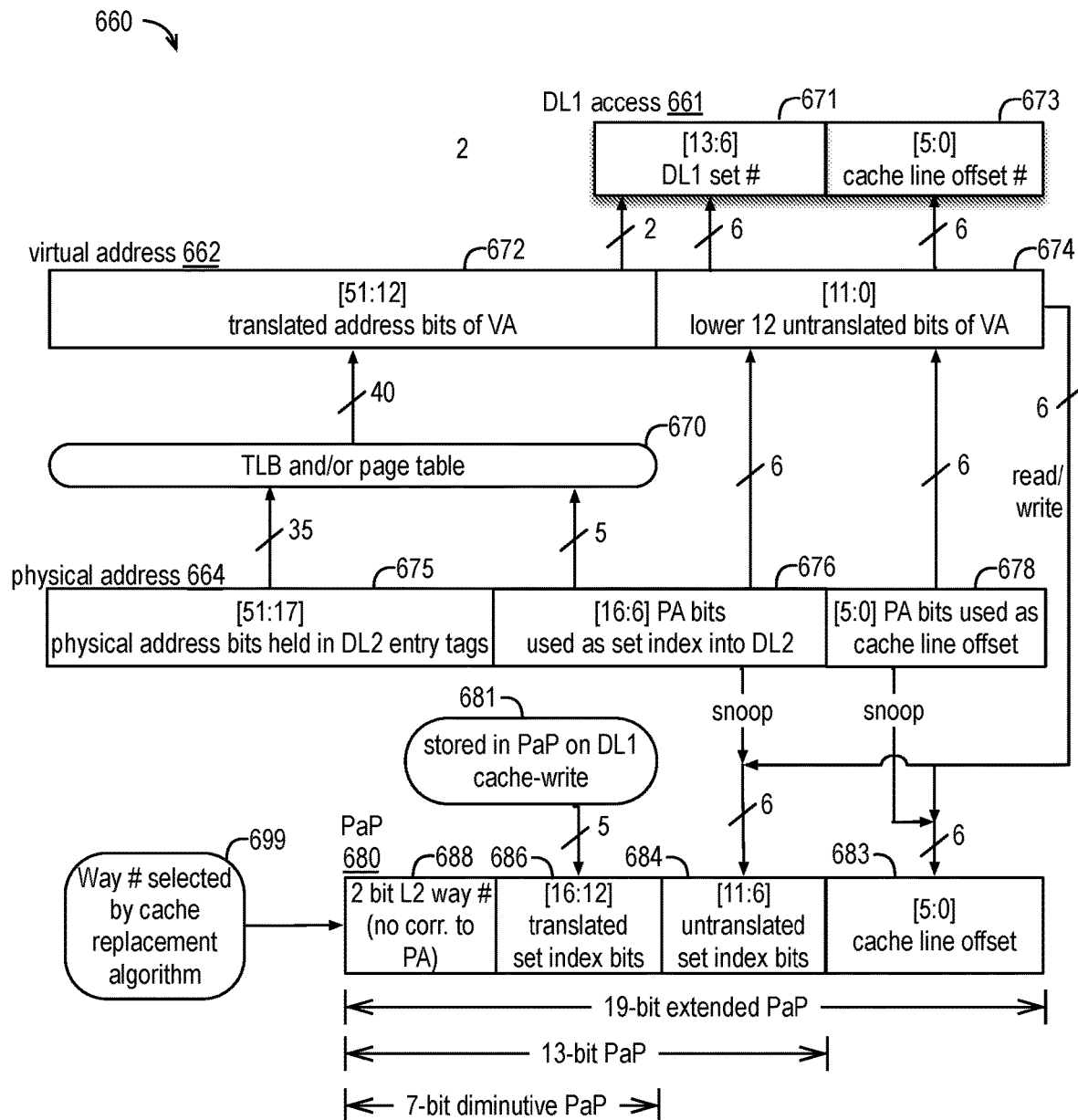
FIG. 9 is a block diagram illustrating sources of and interrelationships between bits of the physical address, virtual address, DL1 set index, DL2 set index, and a PaP, a diminutive PaP, and an extended PaP in one embodiment of a processor and its DL1 and DL2 caches.

FIGS. 7-9 illustrate various characteristics of PaPs that, when used in a virtual-L1-cache/inclusive-physical-L2-cache architecture, make them such excellent physical address equivalents. FIG. 7 is a block diagram illustrating one embodiment of a cache architecture that facilitates fast PA-match determinations. FIG. 8 is a block diagram illustrating how including a pointer in a virtual DL1 cache to an entry in an inclusive physical DL2 cache can be used as an accurate, non-aliasing proxy of a complete physical address, significantly reducing the number of bits that need be compared to verify matching PAs. Finally, FIG. 9 is a block diagram that maps relationships between the physical address, virtual address, DL1 and DL2 set indexes, and PaP in one embodiment of a microarchitecture employing a 64 KB 4-way virtual DL1 cache and a 512 KB 4-way physical DL2 cache.

FIG. 7 illustrates a virtually-indexed-and-tagged (VIVT) or a virtually indexed, physically tagged (VIPT) data level-one (DL1) cache 550 and an inclusive physically indexed, physically tagged (PIPT) data level-two (DL2) cache 560. The fact that the DL1 cache is virtually accessible eliminates the need to translate virtual addresses into physical addresses in order to access the cache. The fact that the DL2 cache is an inclusive cache ensures that data in the DL1 cache is always present in the DL2 cache. The fact that the DL2 cache is physically accessible means that snoops can access the DL2 cache without any translations from physical addresses to virtual addresses.

Each entry 553 of the DL1 cache includes a pointer 555 to the corresponding entry 565 of the inclusive physical DL2 cache. This pointer 555 is effectively a key to a translation of a virtual address stored in the DL1 cache to a physical address stored in the DL2 cache. The pointer 555 includes set index bits to index into the DL2 cache and way select bits to identify the way of the identified set that has the corresponding entry 565. The pointer 555, together with the untranslated bits of the virtual address, provide all the information needed to identify the DL2 cache entry that holds a complete copy (less, perhaps, cache line bits) of the physical address.

The pointer makes it possible to use a DL1-cache-resident virtual address to access the complete physical address. The virtual address is used to access the appropriate DL1 cache entry 553 and its tag and the pointer 555 from that tag. The retrieved pointer 555 is used to access the corresponding entry 565 of the DL2 cache and its tag, along with the complete physical address 563 stored in that tag. In other words, the combination of the VIVT/VIPT DL1 cache 550 with the PIPT DL2 cache 560 performs the same functions as, and can act as a replacement for, a level-one TLB.

It should be noted that if the DL2 cache 560 were not inclusive, then there would be no DL2 cache entry 565 corresponding to the DL1 cache entry 553. If the DL2 cache 560 were not physically indexed and tagged, then accessing the DL2 cache 565 would not produce a physical address 563. If the DL1 cache 550 were not at least virtually indexed, then the load or store virtual data address would have to be translated to access the DL1 cache 550. This explains the logic behind arranging a virtual DL1 cache with an inclusive physical DL1 cache.

There are some other notable characteristics of the caches 550 and 560. One is that there will never be the same physical address in two or more entries of the DL2 cache. To put it another way, there is no aliasing of physical addresses in the DL2 cache. On the other hand, two different DL1 entries can have identical PaPs that point to the same DL2 entry. This is illustrated by the arrows from DL1 to DL2.

It would be possible to use the pointer 555 to retrieve the complete physical address corresponding to a virtual address. But in most situations this is not necessary. The fact that a given virtual address can never alias to two different physical addresses at the same time (although the reverse is possible) means that any given pointer 555 can be used as a "proxy" for the complete physical address.

Because the pointer 555 can function as a "proxy," it is also referred to throughout the specification as a "physical address equivalent" and as a "physical address proxy." The pointer 555 functions as a pointer for some functions and as a proxy for others.

Accordingly, a comparison to determine whether a load data address matches a store data address can be performed just as accurately and reliably by comparing the "physical address proxies" (PaPs) of the load and store data addresses. Indeed, it is possible to replace complete physical addresses in many other parts of the microprocessor—including post-STLF physical address matching and write-combining buffer comparisons—with PaPs.

As noted in the prefatory portion, a relationship between a PaP and a physical address is not permanent. As soon as the DL2 cache entry pointed to by the pointer 555 is overwritten with a new physical address, then the pointer 555 relates to a new physical address. For this reason, it is important to distinguish PaPs in use in the processor that, from the beginning, been used to refer to a first physical address from more recent PaPs that refer to a different physical address.

FIG. 8 illustrates metadata 570 that is stored in each entry of one embodiment of a DL1 cache and metadata 580 stored in each entry of one embodiment of a fully inclusive DL2 cache. The DL1 cache metadata 570 includes a VA tag 571, one or more permissions bits 573, a PaP tag 575, and other information. The DL2 cache metadata 580 includes the PA tag 582 (e.g., PA[51:17]) and other information 584. As shown, the PaP tag 575, in conjunction with the physical address bits of the virtual address, identifies the DL2 cache set index bits along with the way number where the corresponding physical address is kept.

FIG. 9 is a diagram 660 that maps relationships between a physical address 664, a virtual address 662, DL1 and DL2 set indexes, and three equivalent PaPs 680 in one embodiment of a microarchitecture employing a 64 KB 4-way virtual DL1 cache and a 512 KB 4-way physical DL2 cache. At the top of the diagram 660, a load or store instruction accesses the DL1 cache (DL1 access 661) using an 8-bit DL1 set index 671 (e.g., VA[13:6]) and a 6-bit cache line offset 673 (e.g., VA[5:0]). The DL1 access 661 gets its bits from the virtual address 662.

The virtual address 662 is derived from the physical address 664. Indeed, the page table and/or TLB 670 assign virtual addresses 662 to physical addresses 664 during memory allocation operations. Of the 52 physical address bits in one implementation of a 64-bit architecture, only the upper 40 bits are translated when forming the virtual address. The lower 12 bits are not translated; therefore, the bottom 12 bits of a physical address and its virtual address are the same.

According to the embodiment of FIG. 9, a physical address 664 for the DL2cache is also divided between 35 upper bits 675 held in the DL2 entry tags (i.e., PA[51:17]), 11 bits used as a set index 676 into the DL2 cache (i.e., PA[16:6]), and 6 bits 678 used as a cache line offset (i.e., PA[5:0]). This division represents how the bits of a physical address are used to access a memory byte in the DL2 cache.

The bottom of FIG. 9 shows the division and origin of a PaP 680 between a 2-bit DL2 way select number 688, five translated DL2 cache set index bits 686 (i.e., PA[16:12]), six untranslated DL2 set index bits 684 (i.e., PA[11:6]), and five cache line offset bits 683 (i.e., PA[5:0]). The DL2 way select number 688 has no probabilistic relationship to the physical address. Its value is selected by the DL2 cache's cache replacement algorithm (block 699). The translated set index bits 686 are stored in a PaP on a DL1 cache-write (block 681).

Below PaP 680 are shown three outwardly extending arrows of different lengths, indicating the sizes of three different PaPs. For some applications, it is most convenient to store only the smallest sized PaP (i.e., the 7-bit diminutive PaP) needed to point to the appropriate DL2 entry. In a typical 52-bit architecture using the DL1 and DL2 sizes discussed two paragraphs above, the diminutive PaP comprises a 2-bit DL2 way number, which is not derived from the physical address, and the top 5 set index bits (i.e., PA[16:12]) into the DL2.

For some applications, it may be better to use a "regularly" sized 13-bit PaP or "extended" 19-bit PaP. The regularly sized PaP includes all the set index bits into the DL2, thereby identifying a particular cache line in the DL2. The "regular" PaP equals all cache set index bits plus the number of bits needed to select a way (e.g., 2 for a 4-way). For the example of FIG. 9, this constitutes 11+2=13 bits, which is equivalent to a 4 KB physical page address.

The extended PaP supplements the regularly sized PaP with the cache line offset bits 678, thereby identifying a particular byte address in the DL2. In the example of FIG. 9, this constitutes 13+6=19 bits, which is still less than 26 bits or half the size of the physical address. The regular 13-bit sized PaP and extended 19-bit size PaP can be recreated from the diminutive PaP by appending lower bits of the virtual address.

In summary, there are several notable differences between the PaPs illustrated in FIG. 9 and other full-length physical address equivalents. One difference is that the PaPs illustrated in FIG. 9 differ significantly in size from full-length physical address equivalents, such as a lossless encrypted version of the physical address. A second difference between the PaPs of FIG. 9 and other physical address equivalents for an n-way DL2 where n>1, is the inclusion of m way select bits—e.g., 1 for 2 ways; 2 for 4 ways; and 3 for 8 ways—in the PaP. These way-select bits are conceptually independent from the physical address and not identifiable via translation. Instead, these bits are, in one implementation, determined by the DL2 cache replacement algorithm.

In distinguishing the different lengths of PaPs, several key observations can be made. First, the diminutive PaP includes only the way select bits 688 and the DL2 set index bits 686 that are translated (i.e., PA[16:12]). Second, the regular PaP incorporates the untranslated set index bits 684 along with the way select bits 688 and the translated DL2 set index bits 686. And third, the extended PaP incorporates the way select bits 688, all the DL2 set index bits 675 and 657, and all the DL2 cache line offset bits 683.

The lines labeled "snoop" and "read/write" in FIG. 9 illustrate alternative sources of the lower 12 bits of an extended PaP. A cache read or write comes from the execution pipeline and potentially reads or writes all the 12 untranslated bits of the virtual load or store address. A snoop comes from the cache coherency backend of the processor and gets the lower 12 bits of the snoop from the physical address of cache entries that are expected to be consistent.

In the embodiment of FIG. 9, the length of each of the three types of physical access proxies (PaPs) is less than half of the length of the complete physical address (i.e., PaP≤½% PA) for which it substitutes. The term "proxy" signifies that, in spite of its relatively short length, the PaP can be used as a fully functional and equally accurate substitute for the complete physical address.

Concluding Remarks

Although a single core 100 is shown, the processors and SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, and MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

Embodiments disclosed herein are applicable to speculatively executing processors and processor cores. Speculative execution means that an instruction can be executed during a time when at least one instruction older in program order than the instruction has not completed execution, and a possibility exists that execution of the older instruction will result in an abort, i.e., flush, of the instruction. Speculation may exist in many forms, including forwarding on the basis of a partial address match or forwarding before ensuring that all of the permissions are met. Speculation may also exist when forwarding on the basis of a complete address match and complete permissions check because one or more of the addresses being compared may have been calculated from operands that were determined by older, but still uncommitted, instructions.

Embodiments of this application can be implemented using different ways of preventing store-to-load forwarding. One way is to block load instructions from being issued and executed. Yet another way is to temporarily and selectively block load instructions from being dispatched. Other methods can be utilized to effectively prevent load-to-store forwarding. For example, a load instruction may get executed far enough that it briefly forwards data from the store; but very quickly thereafter, the load instruction is cancelled and forced to retry, replay, and/or abort. "Very quickly" means before the load instruction commits, and quickly enough to prevent use by a side channel attack of the forwarding data, or—to put it another way—quickly enough that the data result of the load cannot be speculatively used directly or indirectly by another dependent load or store instruction. As used in the claims, the limitation "preventing store-to-load forwarding" encompasses effectively preventing store-to-load forwarding, as described in this paragraph.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Claim terms used in herein take on their ordinary meaning, if any, as qualified by the context. The ordinary meaning may include a colloquial use of a term, if any, provided that the specification context suggests such use. The ordinary meaning may also take on a meaning that extends use of the word to an analogous field, when it is apparent in the specification that the term is being used in such a way. Claim terms can take on a specialized meaning when it is clear from the specification, as exemplified by the term "store dependence predictor," which as used herein applies to store queues as well as memory dependence predictors. Claim terms that may not have an ordinary meaning, such as "translation context," take on the meaning as defined in the specification or as exemplified by examples in the specification.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A method of mitigating side channel attacks (SCAs) that exploit speculative store-to-load forwarding in a high-performance processor, the method comprising:

conditionally performing speculative store-to-load forwarding (STLF) of data between a load instruction and an uncommitted older store instruction in an execution pipeline;

wherein a first condition of said conditionally performing speculative STLF is a verification that a complete physical data address of the load instruction matches a complete physical data address of the store instruction;

wherein the processor is high-performance in that it is a superscalar, out-of-order, and speculative executing processor; and wherein said verification mitigates SCAs that exploit speculative store-to-load forwarding by:

speculatively executing a first load instruction that does not have permission to access a secret value at the load instruction's data address;

generating a second address that is a function of the secret value, wherein the function maps the second address to one of $2^n$ lines of a cache, where n is an integer;

speculatively executing a second load instruction that loads an arbitrary value located at the second address; and probing the cache to determine where in the cache the arbitrary value was stored, thereby revealing the secret value.

2. The method of claim 1, wherein a second condition of said conditionally performing speculative STLF is a verification that the load and store instructions have valid translations.

3. The method of claim 1, wherein a second condition of said conditionally performing speculative STLF is that the load instruction and the store instruction each have respective permissions to access the data.

4. The method of claim 1, wherein a second condition of said conditionally performing speculative STLF is that the load and store accesses have matching sizes and starting physical addresses for the data.

5. The method of claim 1, wherein a second condition of said conditionally performing speculative STLF is that the load and store instructions have access sizes and starting physical addresses for the data that ensure that the load instruction will get all its bytes from the store instruction.

6. The method of 1, wherein the comparing step prevents said SCAs.

7. The method of claim 1, wherein the processor includes a level-one virtual data cache and there are virtual data addresses determinable using operands of the load and store instructions, the method further comprising:

storing the load and store instructions' physical data addresses or equivalents thereof in the level-one virtual data cache;

calculating the store instruction's virtual data address;

looking up the store instruction's virtual data address in the level-one virtual data cache;
when the lookup results in a cache hit, obtaining the store instruction's physical data address or equivalent from the level-one virtual data cache;
calculating the load instruction's virtual data address;
looking up the load instruction's virtual data address in the level-one virtual data cache;
when the latter lookup results in a cache hit, obtaining a physical load data address or equivalent from a tag RAM or a way select directory (WaySelDir) of the level-one virtual data cache; and
comparing the load and store instructions' physical data addresses or equivalents;
wherein when the load and store instructions' physical data addresses or their physical equivalents match, the first condition is satisfied.

8. The method of claim 7, wherein the lookups are of a tag RAM of the cache.

9. The method of claim 7, wherein the lookups are of the WaySelDir, the WaySelDir including bits that indicate a way of a level-two cache that is inclusive of the level-one virtual data cache, the WaySelDir further including some but less than all bits required to select a set of the level-two cache.

10. The method of claim 7, wherein for each of the storing, obtaining, and comparing steps, physical data address equivalents are used in substitution of the complete physical data addresses, wherein the physical data address equivalents have shorter bit lengths than the complete physical data addresses.

11. The method of claim 10, further comprising storing the store instruction's physical data address equivalent, after obtaining it from the level-one virtual data cache, in a store queue entry.

12. The method of claim 7, wherein the lookups are of the tag RAM or the WaySelDir, the method further comprising obtaining permission bits from the tag RAM or the WaySelDir.

13. The method of claim 1, wherein verifying that the load instruction's complete physical data address matches the store instruction's complete physical data address comprises comparing an equivalent of the load instruction's complete physical data address with an equivalent of the store instruction's complete physical data address.

14. The method of claim 13, wherein:
each equivalent includes some but not all bits of the corresponding complete physical data address and one or more non-address bits that aid in identifying an associated entry in an inclusive level-two cache; and
the entry and/or metadata about the entry reveals other bits of the complete physical data addresses.

15. A superscalar, out-of-order, speculative executing processor that mitigates side channel attacks (SCAs) that exploit speculative store-to-load forwarding, the high-performance processor comprising:
an out-of-order, speculative-executing execution pipeline;
address-resolving logic that verifies that a complete physical data address of a load instruction matches a complete physical data address of an uncommitted store instruction; and
store-to-load forwarding logic associated with the execution pipeline that speculatively forwards data from the uncommitted store instruction to the load instruction when the complete physical data addresses have been verified to match;
wherein the store-to-load forwarding logic refrains from forwarding the data when the complete physical data addresses of the load and uncommitted store instructions do not match; and
wherein the store-to-load forwarding logic refraining from forwarding the data when the complete physical data addresses of the load and uncommitted store instructions do not match mitigates SCAs that exploit speculative store-to-load forwarding by:
speculatively executing a first load instruction that does not have permission to access a secret value at the load instruction's data address;
generating a second address that is a function of the secret value, wherein the function maps the second address to one of $2^n$ lines of a cache, where n is an integer;
speculatively executing a second load instruction that loads an arbitrary value located at the second address; and
probing the cache to determine where in the cache the arbitrary value was stored, thereby revealing the secret value.

16. The processor of claim 15, wherein the address-resolving logic is configured to store complete physical addresses or their equivalents in a tag RAM of a virtually accessible DL1 cache.

17. The processor of claim 15, wherein the address-resolving logic is configured to access the load and store instruction's physical data addresses of their equivalents from a cache way select directory (WaySelDir).

18. The processor of claim 15, wherein the processor is configured to prioritize a set of store instructions for physical data address comparison using history-based predictive logic and comparing the physical data addresses of the set of store instructions, or a further-prioritized subset thereof, with the load physical data addresses.

19. The processor of claim 15, wherein the address-resolving logic is configured to store a physical address proxy (PaP) instead of a complete physical address in a tag RAM and/or a way select directory (WaySelDir) of a level-one cache of the processor, wherein the PaP is an equivalent of a complete physical data address.

20. The processor of claim 15, further comprising a virtual level-one data cache that translates virtual addresses of the load and store instructions into physical addresses or equivalents thereof.

21. The processor of claim 20, wherein the virtual level-one data cache is configured to cache permission bits for the load and store data.

22. The processor of claim 15, wherein the address-resolving logic is configured to perform said verification of matching physical data addresses after the load instruction has issued.

23. The processor of claim 15, further comprising permission-checking logic that confirms whether the load instruction has fully passed a permission check before forwarding an uncommitted store result to the load instruction and abstains from forwarding a store result to the load instruction when the store and/or load instructions have failed their respective permission checks.

24. A non-transitory computer-readable medium having instructions stored thereon that are capable of causing or configuring a superscalar, out-of-order, speculative executing processor to include:
an out-of-order, speculative-executing execution pipeline;

address-resolving logic that verifies that a complete physical data address of a load instruction matches a complete physical data address of an uncommitted store instruction; and store-to-load forwarding logic associated with the execution pipeline that speculatively forwards data from the uncommitted store instruction to the load instruction when the complete physical data addresses have been verified to match;

wherein the store-to-load forwarding logic refrains from forwarding the data when the complete physical data addresses of the load and uncommitted store instructions do not match; and wherein the store-to-load forwarding logic refraining from forwarding the data when the complete physical data addresses of the load and uncommitted store instructions do not match mitigates SCAs that exploit speculative store-to-load forwarding by:

speculatively executing a first load instruction that does not have permission to access a secret value at the load instruction's data address;

generating a second address that is a function of the secret value, wherein the function maps the second address to one of $2^n$ lines of a cache, where n is an integer;

speculatively executing a second load instruction that loads an arbitrary value located at the second address; and probing the cache to determine where in the cache the arbitrary value was stored, thereby revealing the secret value.

25. A method of mitigating side channel attacks (SCAs) that exploit speculative store-to-load forwarding in a high-performance processor, the method comprising:

conditionally performing speculative store-to-load forwarding (STLF) of data between a load instruction and an uncommitted older store instruction in an execution pipeline;

wherein a first condition of said conditionally performing speculative STLF is a verification that a complete physical data address of the load instruction matches a complete physical data address of the store instruction;

wherein the processor is high-performance in that it is a superscalar, out-of-order, and speculative executing processor;

wherein the processor includes a level-one virtual data cache and there are virtual data addresses determinable using operands of the load and store instructions, the method further comprising:

storing the load and store instructions' physical data addresses or equivalents thereof in the level-one virtual data cache;

calculating the store instruction's virtual data address;

looking up the store instruction's virtual data address in the level-one virtual data cache;

when the lookup results in a cache hit, obtaining the store instruction's physical data address or equivalent from the level-one virtual data cache;

calculating the load instruction's virtual data address;

looking up the load instruction's virtual data address in the level-one virtual data cache;

when the latter lookup results in a cache hit, obtaining a physical load data address or equivalent from a tag RAM or a way select directory (WaySelDir) of the level-one virtual data cache; and comparing the load and store instructions' physical data addresses or equivalents;

wherein when the load and store instructions' physical data addresses or their physical equivalents match, the first condition is satisfied.

26. A superscalar, out-of-order, speculative executing processor that mitigates side channel attacks (SCAs) that exploit speculative store-to-load forwarding, the high-performance processor comprising:

an out-of-order, speculative-executing execution pipeline;

address-resolving logic that verifies that a complete physical data address of a load instruction matches a complete physical data address of an uncommitted store instruction; and store-to-load forwarding logic associated with the execution pipeline that speculatively forwards data from the uncommitted store instruction to the load instruction when the complete physical data addresses have been verified to match;

wherein the store-to-load forwarding logic refrains from forwarding the data when the complete physical data addresses of the load and uncommitted store instructions do not match; and wherein the address-resolving logic is configured to store a physical address proxy (PaP) instead of a complete physical address in a tag RAM and/or a way select directory (WaySelDir) of a level-one cache of the processor, wherein the PaP is an equivalent of a complete physical data address.

27. A method of mitigating side channel attacks (SCAs) that exploit speculative store-to-load forwarding in a high-performance processor, the method comprising:

conditionally performing speculative store-to-load forwarding (STLF) of data between a load instruction and an uncommitted older store instruction in an execution pipeline;

wherein a first condition of said conditionally performing speculative STLF is a verification that a complete physical data address of the load instruction matches a complete physical data address of the store instruction;

wherein the processor is high-performance in that it is a superscalar, out-of-order, and speculative executing processor;

wherein the verification that the load instruction's complete physical data address matches the store instruction's complete physical data address comprises comparing an equivalent of the load instruction's complete physical data address with an equivalent of the store instruction's complete physical data address;

wherein each equivalent includes some but not all bits of the corresponding complete physical data address and one or more non-address bits that aid in identifying an associated entry in an inclusive level-two cache; and wherein the entry and/or metadata about the entry reveals other bits of the complete physical data addresses.

* * * * *

UNITED STATES PATENT AND TRADEMARK OFFICE
CERTIFICATE OF CORRECTION

PATENT NO. : 11,989,285 B2
APPLICATION NO. : 17/472376
DATED : May 21, 2024
INVENTOR(S) : John G. Favor and Srivatsan Srinivasan Page 1 of 1

It is certified that error appears in the above-identified patent and that said Letters Patent is hereby corrected as shown below:

In the Claims

In Column 30, Line 33, in Claim 1, delete "$2'''$" and insert -- $2^n$ --, therefor.

In Column 32, Line 16, in Claim 15, delete "$2'''$" and insert -- $2^n$ --, therefor.

In Column 33, Line 24, in Claim 24, delete "$2'''$" and insert -- $2^n$ --, therefor.

Signed and Sealed this
Second Day of July, 2024

Katherine Kelly Vidal
*Director of the United States Patent and Trademark Office*